US011805292B2

(12) United States Patent
Wang et al.

(10) Patent No.: US 11,805,292 B2
(45) Date of Patent: Oct. 31, 2023

(54) DISPLAY APPARATUS AND CONTENT DISPLAY METHOD

(71) Applicant: Hisense Visual Technology Co., Ltd., Shandong (CN)

(72) Inventors: Xuelei Wang, Shandong (CN); Honglong Si, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 8 days.

(21) Appl. No.: 17/645,551

(22) Filed: Dec. 22, 2021

(65) Prior Publication Data
US 2022/0116676 A1 Apr. 14, 2022

Related U.S. Application Data

(63) Continuation of application No. PCT/CN2020/086054, filed on Apr. 22, 2020.

(30) Foreign Application Priority Data

Nov. 4, 2019 (CN) .......................... 201911067371.0

(51) Int. Cl.
*H04N 21/431* (2011.01)
*H04N 21/234* (2011.01)
(Continued)

(52) U.S. Cl.
CPC ... *H04N 21/4312* (2013.01); *H04N 21/23418* (2013.01); *H04N 21/4122* (2013.01);
(Continued)

(58) Field of Classification Search
None
See application file for complete search history.

(56) References Cited

U.S. PATENT DOCUMENTS

2012/0185886 A1  7/2012  Charania et al.
2015/0156551 A1  6/2015  Maruyama
(Continued)

FOREIGN PATENT DOCUMENTS

CN    105163164 A    12/2015
CN    105263034 A    1/2016
(Continued)

OTHER PUBLICATIONS

International Search Report, dated Jul. 22, 2020, from Chinese PCT Application No. PCT/CN2020/086054 filed Apr. 22, 2020.

*Primary Examiner* — Samira Monshi
(74) *Attorney, Agent, or Firm* — Workman Nydegger

(57) ABSTRACT

Disclosed are display apparatus and method. The method includes: a first controller of a display apparatus obtains information of a video image in a first user interface on a first display screen of a display apparatus and sends the information of the video image to a server through a first communicator associated with the first controller, where the server is configured to obtain a search identifier of an object in the video image according to the information of the video image and send the search identifier to a second controller of the display apparatus. A second controller of the display apparatus receives the search identifier through a second communicator associated with the second controller and controls a second display screen of the display apparatus to display a third user interface, where the third user interface includes the search identifier of the object in the video image.

18 Claims, 19 Drawing Sheets

(51) Int. Cl.
  *H04N 21/41*   (2011.01)
  *H04N 21/422*  (2011.01)
  *H04N 21/472*  (2011.01)
  *H04N 21/478*  (2011.01)
  *H04N 21/488*  (2011.01)

(52) U.S. Cl.
  CPC . *H04N 21/42204* (2013.01); *H04N 21/47217* (2013.01); *H04N 21/47815* (2013.01); *H04N 21/4886* (2013.01)

(56) References Cited

U.S. PATENT DOCUMENTS

2017/0228781 A1    8/2017  Conte
2019/0384789 A1*  12/2019  Lee .................... G06F 16/78

FOREIGN PATENT DOCUMENTS

CN    109413477 A    3/2019
KR    20150057822 A  5/2015

* cited by examiner

DISPLAY APPARATUS AND CONTENT DISPLAY METHOD

The application is a continuation application of International Application No. PCT/CN2020/086054, filed on Apr. 22, 2020, which is based upon and claims the priority from Chinese Patent Application No. 201911067371.0, filed on Nov. 4, 2019 and entitled "Display apparatus and Content Display Method", which is hereby incorporated by reference in its entirety.

FIELD

Embodiments of the disclosure relate to display technology, and in particular, to a display apparatus and a content display method.

BACKGROUND

With the increasing user demands for televisions, the smart television also has more and more functions. For example: during the playback of a movie on the display screen of the smart television, some push messages, such as weather notification message, application update message, external device access message, etc., often pop up at the top of the screen, thus usually cover part of the playback interface of the movie and affect the users' view experience.

SUMMARY

Embodiments of the disclosure provide a display apparatus and a content display method.

In a first aspect, a display apparatus is provided, including:
 a first display screen;
 a second display screen;
 a user input interface configured to receive commands input from a user;
 a modem configured to receive and decode service content from a digital broadcast signal;
 a communicator configured to communicate with a server;
 a controller configured to:
 control the first display screen to display the content;
 control the second display screen to display a push message, where the push message is generated based on a view history of the service content or generated based on network data.

In some embodiments, the controller is further configured to: control the second display screen to play at least one push message automatically in an order of generating push messages.

In some embodiments, the content in the push message can include any one of webpage text recommendation, video on demand recommendation, shopping webpage link recommendation, and application recommendation.

In a second aspect, a display apparatus is provided, including:
 a first display screen;
 a second display screen;
 a user input interface configured to receive commands input from a user;
 a modem configured to receive and decode service content from a digital broadcast signal;
 a communicator configured to communicate with an external device or a server to obtain content from the server;
 a controller configured to:
 control the first display screen to play the content;
 control the second display screen to display a push message, where the push message includes recommended content associated with content identified in a display image corresponding to the service content, and/or an input interface of a user control command for responding to operations associated with the recommended content;
 in response to a command for indicating a selector to focus, control the second display screen to display the selector for indicating selecting any push message.

In some embodiments, the second display screen is updated to display an input interface of the user control command for indicating viewing other push messages or updated to display an initial interface after displaying a preset number of push messages for a preset time.

In a third aspect, a display apparatus is provided, including:
 a first display screen;
 a second display screen;
 a user input interface configured to receive commands input from a user;
 a modem configured to receive and decode service content from a digital broadcast signal;
 a communicator configured to communicate with an external device or a server to obtain service content from the server a controller configured to:
 control the first display screen to play the content;
 control the second display screen to display a push message, where the push message includes recommended content associated with content identified in a display image corresponding to the service content, and/or an input interface of a user control command for responding to operations associated with the recommended content;
 in response to a command for activating a target push message from the user, control the first display screen to display content associated with a target push message and to pause playing the service content in the first display screen.

In some embodiments, the recommended content can include one or more of: at least one type of content recommendation related to the content identified in the display image corresponding to a broadcast program or the service content, and a brief description related to the at least one type of content recommendation, and one or more content source of the at least one type of content recommendation.

In a fourth aspect, a display apparatus is provided, including:
 a first display screen;
 a second display screen;
 a user input interface configured to receive commands input from a user;
 a modem configured to receive and decode service content from a digital broadcast signal;
 a communicator configured to communicate with an external device or a server to obtain service content from the server or external device;
 a controller configured to:
 control the first display screen to play the service content;
 control the second display screen to display a push message, where the push message includes recommended content associated with content identified in a display image corresponding to the service content, and/or an input interface of a user control command for responding to operations associated with the recommended content;

in response to a command for activating a target push message from a user, control the first display screen to display content associated with a target push message and to pause playing the service content in the first display screen;

control the first display screen to continue to play the service content in response to a command for stopping displaying the content associated with the target push message.

In some embodiments, a screen display object corresponding to the target push message slides out from a boundary of the second display screen and slides into the first display screen from a boundary of the first display screen in form of animation.

In a fifth aspect, a display apparatus is provided, including:
a first display screen;
a second display screen;
a user input interface configured to receive commands input from a user;
a communicator configured to communicate with an external device or a server to obtain service content from the external device and server;
a controller configured to:
control the first display screen to play a first media resource in the service content;
control the second display screen to display recommended content associated with content identified in a display image corresponding to the first media resource in response to detecting that the first display screen plays the first media resource;
control the second display screen to display other media resources other than but associated with the first media resource in the service content in response to detecting that the first display screen is about to finish playing the first media resource.

In some embodiments, the recommended content at least includes: character recommendation, product recommendation, and scenic spot recommendation.

In a sixth aspect, a display apparatus is provided, including:
a first display screen configured to display a first user interface;
a second display screen configured to display a second user interface;
a first controller in communication with the first display screen, and a second controller in communication with the second display screen, wherein the first controller is in communication with the second controller;
the first controller is configured to:
obtain the information of a video image in the first user interface and send the information of the video image to a server through a first communicator, wherein the server is configured to obtain a search identifier of an object in the video image according to the information of the video image and send the search identifier to the second controller;
the second controller is configured to:
receive the search identifier through a second communicator and control the second display screen to display a third user interface, wherein the third user interface includes the search identifier of the object in the video image.

In some embodiments, the first controller is further configured to:
receive a control command for a selector through a user input interface, control the first display screen to remove the selector in response to the control command, and send the control command to the second controller;
the second controller is configured to:
control the second display screen to display the selector, wherein the third user interface further includes the selector.

In some embodiments, the first controller is further configured to:
receive a first user input for indicating going back through the user input interface, and send the first user input to the second controller;
the second controller is configured to:
control the second display screen to display the second user interface in response to the first user input.

In some embodiments, the first controller is further configured to:
receive a second user input for indicating selecting any search identifier via the user input interface; and in response to the second user input, pause playing videos, obtain the search information corresponding to the search identifier, and control the first display screen to display the search information, wherein the second user input is applied to the second display screen through the selector, and the second user interface includes the search information.

In some embodiments, the search information is displayed floating on one side of the first user interface.

In some embodiments, the first controller is further configured to:
receive a third user input for the search information through the user input interface, obtain the associated information corresponding to the search information in response to the third user input, and control the first display screen to display the association information and remove the search information, wherein the associated information is text information or video information.

In some embodiments, when the associated information is text information, the first controller is specifically configured to control the associated information to be displayed floating on one side of the first user interface.

In some embodiments, when the associated information is video information, the first controller is configured to control the first display screen to display a fourth user interface, which includes the associated information.

In some embodiments, the first controller is further configured to:
obtain the information of a next frame image of the video image within a preset time period, and send the information of the next frame image to a server through the first communicator, wherein the server is configured to obtain a search identifier of the next frame image according to the information of the next frame and send search identifiers of objects in the next frame image to the second controller;
the second controller is configured to:
receive the search identifiers of the objects in the next frame image through the second communicator, and control the second display screen to display a fifth user interface, wherein the fifth user interface includes the search identifiers of the objects in the video image and the next frame image.

In some embodiments, the second controller is further configured to:

control the second display screen to present the search identifiers in a scrollable manner when the number of the search identifiers is greater than a preset value.

In a seventh aspect, a content display method is provided, including:

controlling a first display screen to display service content from a digital broadcast signal;

controlling a second display screen to display a push message sent from a server, wherein the push message is generated based on a view history of the content or generated based on network data.

In some embodiments, the content in the push message can include any one of webpage text recommendation, video on demand recommendation, shopping webpage link recommendation, and application recommendation.

In an eighth aspect, a content display method is provided, including:

controlling a first display screen to play service content, wherein the service content is carried by a digital broadcast signal;

controlling a second display screen to display a push message from a server, where the push message includes recommended content associated with content identified in a display image corresponding to the service content, and/or an input interface of a user control command for responding to operations associated with the recommended content;

in response to a command for indicating a selector to focus, controlling the second display screen to display the selector for indicating selecting any push message.

In some embodiments, the second display screen is updated to display an input interface of a user control command for indicating viewing other push messages or updated to display an initial interface after displaying a preset number of push messages for a preset time.

In a ninth aspect, a content display method is provided, including:

controlling a first display screen to play service content, wherein the service content is carried by a digital broadcast signal or provided by an external device or a server;

controlling a second display screen to display a push message from the server, where the push message includes recommended content associated with content identified in a display picture corresponding to the service content, and/or an input interface of a user control command for responding to operations associated with the recommended content;

in response to a command for activating a target push message from a user, controlling the first display screen to display content associated with a target push message and to pause playing the service content in the first display screen.

In some embodiments, the recommended content can include one or more of: at least one type of content recommendation related to the content identified in the display image corresponding to a broadcast program or the service content, and a brief description related to the at least one type of content recommendation, and one or more content source of the at least one type of content recommendation.

In a tenth aspect, a content display method is provided, including:

controlling a first display screen to play service content, wherein the service content is carried by a digital broadcast signal or from an external device or a server;

controlling a second display screen to display a push message, where the push message includes recommended content associated with content identified in a display image corresponding to the service content, and/or an input interface of a user control command for responding to operations associated with the recommended content;

in response to a command for activating a target push message from a user, controlling the first display screen to display content associated with a target push message and to pause playing the service content in the first display screen;

in response to a command for stopping displaying the content associated with the target push message from a user, controlling the first display screen to continue to play the service content.

In some embodiments, a screen display object corresponding to the target push message slides out from a boundary of the second display screen and slides into the first display screen from a boundary of the first display screen in form of animation.

In an eleventh aspect, a content display method is provided, including:

controlling a first display screen to play a first media resource in service content from an external device or a server;

controlling a second display screen to display recommended content associated with content identified in a display image corresponding to the first media resource in response to detecting that the first display screen plays the first media resource;

controlling the second display screen to display other media resources other than but associated with the first media resource in the service content, in response to detecting that the first display screen is about to finish playing the first media resource.

In a twelfth aspect, a display method is provided, including:

a first controller obtains the information of a video image in a first user interface and sends the information of the video image to a server through a first communicator, wherein the server is configured to obtain a search identifier of an object in the video image according to the information of the video image and send the search identifier to a second controller;

the second controller receives the search identifier through a second communicator and controls a second display screen to display a third user interface, wherein the third user interface includes the search identifier of the object in the video image.

DETAILED DESCRIPTION

Figure 1:
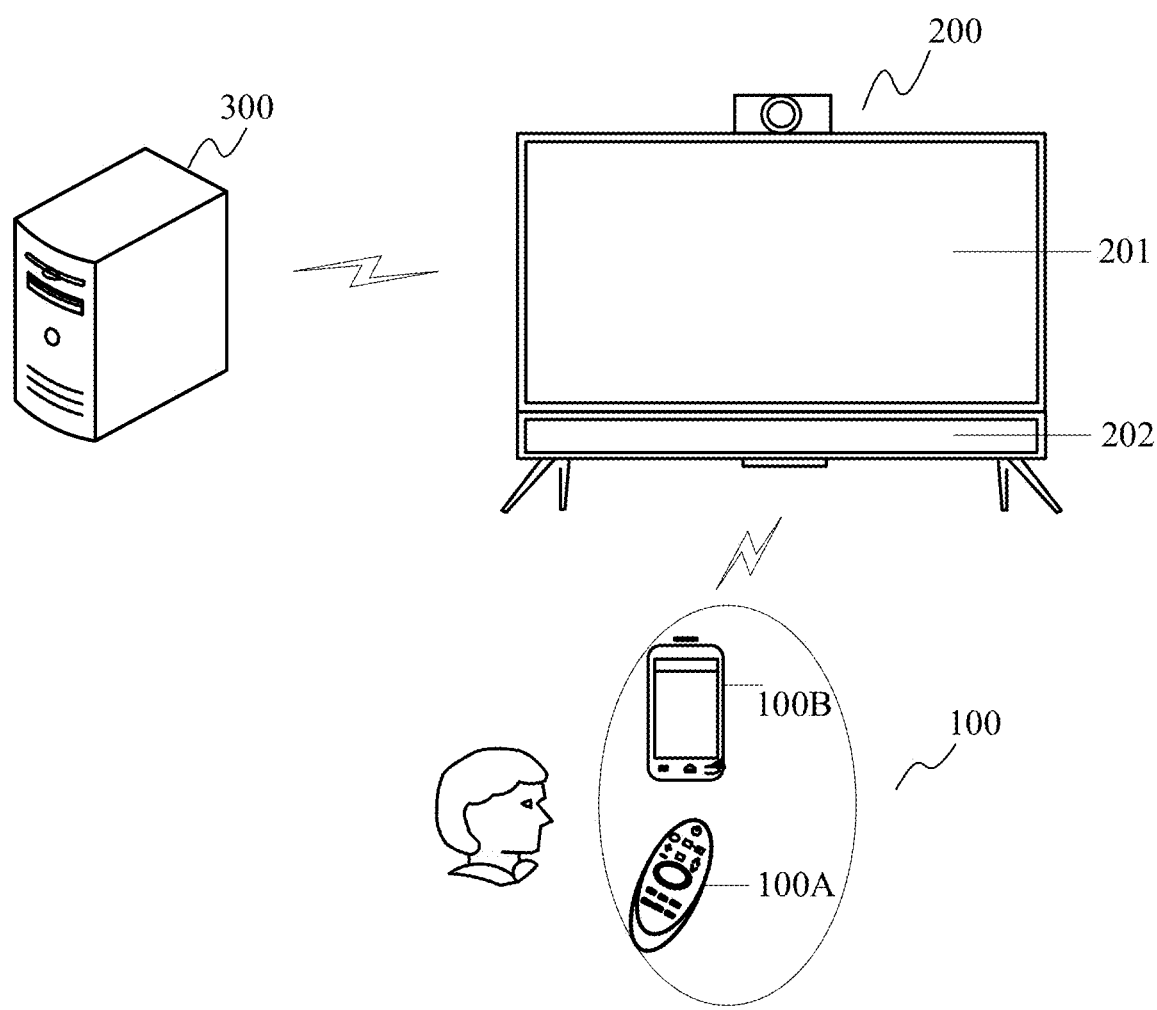
FIG. 1 shows a schematic diagram illustrating an operation scene between a display apparatus and a control device according to some embodiments.

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments. Based upon embodiments of the disclosure, all of other embodiments obtained by those ordinary skilled in the art without creative work shall fall within the protection scope of the disclosure.

The terms such as "first", "second", etc. in the specification, claims and drawings of the disclosure are used to distinguish the similar objects, but not necessarily to describe a particular order or sequence.

The disclosure is mainly aimed at simultaneous processing of sound and images for a display apparatus with two systems and two displays, that is, the display apparatus has a first controller (first hardware system, chip A), a second controller (second hardware system, chip N), a first display screen and a second display screen. It should be noted that, in addition to two independent hardware systems or controllers described above, the first controller and the second controller can also be implemented as one hardware system or controller. The specific implementation can be flexibly configured according to actual needs, and is not specifically limited in these embodiments. The specific implementation of two controllers is only taken as an example for description.

Firstly the structure, functions, implementation modes and other aspects of a display apparatus with a two system hardware structure will be illustrated below in details.

For the convenience of users, various input/output interfaces are usually provided on the display apparatus to facilitate the connection with different peripheral devices or cables to achieve corresponding functions. In a case where an external high-definition camera is connected to the display apparatus, if no hardware interface for receiving the source codes of the high-pixel camera is provided in the hardware system of the display apparatus, then the data received from the camera cannot be presented on the display screen of the display apparatus.

In addition, due to the hardware structure, the hardware system of the traditional display apparatus only supports one stream of hard decoding resource, and can usually only supports the decoding of at most 4K resolution video. Therefore, when you want to perform the video chat while watching the Internet TV, in order not to reduce the definition of the network video images, the hard decoding resource (usually, the GPU in the hardware system) is used to decode the network video. However, in this case, the general-purpose processor (such as CPU) in the hardware system can only be used to process the video chat image by soft decoding the video.

The soft decoding process of the video chat images will greatly increase the data processing burden of the CPU. When the data processing burden of the CPU is too heavy, the image may freeze or become unsmooth. Further, due to the data processing capability of the CPU, when the video chat images is processed by CPU through soft decoding, it is usually impossible to realize multi-channel video calls. When a user wants to chat with other users simultaneously by video calls in the same chat scenario, the access is easily blocked.

In view of the above issues, embodiments of the disclosure disclose a two hardware system architecture to support multiple video calls (at least one local video).

The terms involved in the disclosure will be described below with reference to the drawings. It should be noted that the following description of all the terms is only to make the content of the disclosure easier to be understood, and does not intend to limit the protection scope of the disclosure.

The term "remote controller" used in the disclosure refers to a component of an electronic device (such as the display apparatus disclosed in the disclosure), which can generally control the electronic device wirelessly within a relatively short distance range. This component is generally be connected to the electronic device by using the infrared ray and/or Radio Frequency (RF) signal and/or Bluetooth, and may also include the WiFi, wireless USB, Bluetooth, motion sensor and other functional modules. For example, the handheld touch remote controller uses the user interface in the touch screen to replace most of the physical built-in hard keys in the general remote control device.

The term "gesture" used in some embodiments of the disclosure refers to a user behavior through which the user expresses an expected thought, action, purpose or outcome by a hand shape change or hand action, etc.

The term "hardware system" used in some embodiments of the disclosure can refer to a physical component which comprises an integrated circuit (IC), a printed circuit board (PCB) and other mechanical, optical, electrical and magnetic devices and which has the functions of calculation, control, storage, input and output. In embodiments of the disclosure, a hardware system is also usually called as a motherboard or a chip.

FIG. 1 shows a schematic diagram of an operating scenario between a display apparatus and a control device in an embodiment. As shown in FIG. 1, a user can operate a display apparatus 200 through a control device 100.

Here, the control device 100 may be a remote controller, which includes the infrared protocol communication or Bluetooth protocol communication and other short-range communication methods, etc., and controls the display apparatus 200 wirelessly or by other wired methods. The user may input user commands through the keys on the remote controller, voice inputs, control panel inputs, etc. to control the display apparatus 200. For example, the user may input the corresponding control commands through the volume +/− keys, channel control keys, up/down/left/right directional keys, voice input keys, menu key, power key, etc. on the remote controller to control the functions of the display apparatus 200.

The control device 100 can also be a smart device, for example, a mobile terminal 100B, a tablet computer, a computer, a notebook computer, etc, and can be communicated with the display apparatus 200 through a local area network (LAN), a wide area network (WAN), a wireless local area network (WLAN) or other networks, and can control the display apparatus 200 through an application corresponding to the display apparatus 200. For example, the display apparatus 200 can be controlled through an application running on a smart device. The application can provide various controls for the user on a screen related to a smart device through an intuitive user interface (UI).

Exemplarily, both the mobile terminal 100B and the display apparatus 200 can install software applications, and implement the connection and communication through the network communication protocols, achieving the purpose of one-to-one control operation and data communication. For example, it is possible to establish a control command protocol between the mobile terminal 100B and the display apparatus 200, synchronize the remote control keyboard onto the mobile terminal 100B, and realize the function of controlling the display apparatus 200 by controlling the user interface on the mobile terminal 100B. The audio/video content displayed on the mobile terminal 100B may also be transmitted to the display apparatus 200 to realize the synchronous display function.

As shown in FIG. 1, the display apparatus 200 further performs the data communication with a server 300 through various communication methods. The display apparatus 200 may be allowed to perform the communication and connection through a Local Area Network (LAN), a Wireless Local Area Network (WLAN), and other networks. The server 300 may provide various contents and interactions to the display apparatus 200.

Exemplarily, the display apparatus 200 receives the software updates by sending and receiving the information and the Electronic Program Guide (EPG) interaction, or accesses a remotely stored digital media library. The server 300 may be one group or multiple groups, and may be one or more types of servers. The server 300 provides the video on demand, advertising service and other network service content.

The display apparatus 200 includes a first display screen 201 and a second display screen 202. The first display screen 201 and the second display screen 202 are independent of each other, and two hardware control systems are used between the first display screen 201 and the second display screen 202.

Here, the first display screen 201 and the second display screen 202 can be used for different display. For example, the first display screen 201 can be used for display of traditional television programs, and the second display screen 202 can be used for display of the auxiliary information such as notification message, voice assistant, etc.

In some embodiments, the content displayed on the first display screen 201 and the content displayed on the second display screen 202 may be independent of each other without affecting each other. For example, when the first display screen 201 is playing a television program, the second display screen 202 may display the information such as time, weather, temperature and alert messages that are not related to the television program.

In some embodiments, the content displayed on the first display screen 201 may be associated with the content displayed on the second display screen 202. For example, when the first display screen 201 plays the main screen of the video chat, the second display screen 202 may display the head portrait of the user participating the video chat, the chat duration and other information of the video chat.

In some embodiments, some or all of the content displayed on the second display screen 202 can be displayed on the first display screen 201. For example, the information such as time, weather, temperature and reminder message displayed on the second display screen 202 can be moved to the first display screen 201, while the second display screen 202 can be used to display other information.

In addition, the first display screen 201 also displays an interactive interface which involves multiple parties while displaying the traditional television program. The interactive interface involving multiple parties does not cover the interface of the traditional television program. Here, the disclosure does not limit the display mode of the interface of the traditional television program and the interactive interface. For example, the disclosure can set the positions and sizes of the interface of the traditional television program and the interactive interface according to the presentation priorities of the interface of the traditional television program and the interactive interface involving multiple parties.

As an example, the presentation priority of the interface of the traditional television program is higher than the priority of the interactive interface involving multiple parties, the area of the interface of the traditional television program is larger than the area of the interactive interface involving multiple parties. In some embodiments, the interactive interface can be arranged at one side of the interface of the traditional television program or floating at a corner of the interface of the traditional television program.

On the one hand, the display apparatus 200 may be a liquid crystal display, an OLED display, or a projection display apparatus. The specific type, size, resolution, etc. of the display apparatus are not limited, and those skilled in the art may understand that some changes may be made in the performance and configuration of the display apparatus 200 as needed.

In addition to the broadcast receiving television function, the display apparatus 200 may additionally provide the smart network television function that computer supports. Exemplarily, it includes: network television, smart television, Internet Protocol television (IPTV), etc. In some embodiments, the display apparatus may not be provided with broadcast reception television function.

As shown in FIG. 1, the display apparatus 200 connects with a camera or has a camera, and is configured to present images captured by the camera on the display interface of the display apparatus or another display apparatus, to realize interactions between users. In some embodiments, the images captured by the camera can be displayed in full screen or half screen on the display apparatus, or any optional area.

As an alternative connection, the camera is connected with a rear shell of the display apparatus through a connecting plate, and is fixed on the middle part of the upper side of the rear shell of the display apparatus. As for the installation manner, the camera can be amounted at any position of the rear shell of the display apparatus, as long as an image capture area of the camera is not shielded by the rear shell. For example, the image acquisition area covers the display direction of the display apparatus.

As another alternative connection, the camera is connected with a rear shell of a display apparatus through a connecting plate or other suitable connectors in a way that is able to go up and go down. The connector is provided with a motor for moving up and down, when a user wants to use the camera or when an application wants to invoke the camera, the camera is being moved up above the display, and when the camera is not needed, the camera can be embedded into the rear shell, to protect the camera from being damaged.

As an embodiment, the camera used in the disclosure can be of 16 megapixels, to achieve the purpose of ultrahigh definition display. In implementations, a camera with the pixels being greater than or lower than 16 megapixels can also be adopted.

When the display apparatus has a camera, the contents displayed by the display apparatus in different application scenarios can be combined in multiple different ways, to realize functions which cannot achieve by traditional display apparatuses.

In some embodiments, a user may conduct video chat with at least one user while watching a video program. The video program window can be presented as a background, while the window of video chat can be displayed superposing the background. The function can be called as "chatting while watching".

In some embodiments, in "chatting while watching" context, at least one video chat with another terminal is conducted while live video or network video is being watched.

In some embodiments, a user can conduct a video chat with one or more other user while using an education application for learning. For example, a student can realize remote interaction with a teacher while learning via an education application. The function can be called as "chatting while learning".

In some embodiments, while a user is playing a card game, the user is able to have a video chat with other users from the same game. For example, after launching a game application to participate in the game, a player is able to interact with other players remotely. The function can be vividly called as "playing while watching".

In some embodiments, game scenarios are fused with video images, and the portrait in the video image is cutout and pasted on the face of a character in the game and displayed in the game image, thereby improving user experience.

In some embodiments, in motion-sensing games (such as ball games, boxing, running and dancing), through a camera, poses and movements of the users are acquired, and after detecting body movements and tracking and detecting of key data points of human skeleton, they can fuse with animation images in the game to realize games such as sports games and dance games.

In some embodiments, in a karaoke application, a user is able to video chat with at least one other user. The function can be vividly called as "singing while watching". In some embodiments, when at least one user launches the karaoke application during chatting, these multiple users can record a song together.

In some embodiments, a user can turn on a local camera to have images and videos captured, and the function can be vividly called as "looking in a mirror".

In some embodiments, additional functions can be included or the above functions can be excluded. The functions of the display apparatus are not specifically defined in the disclosure.

Figure 2:
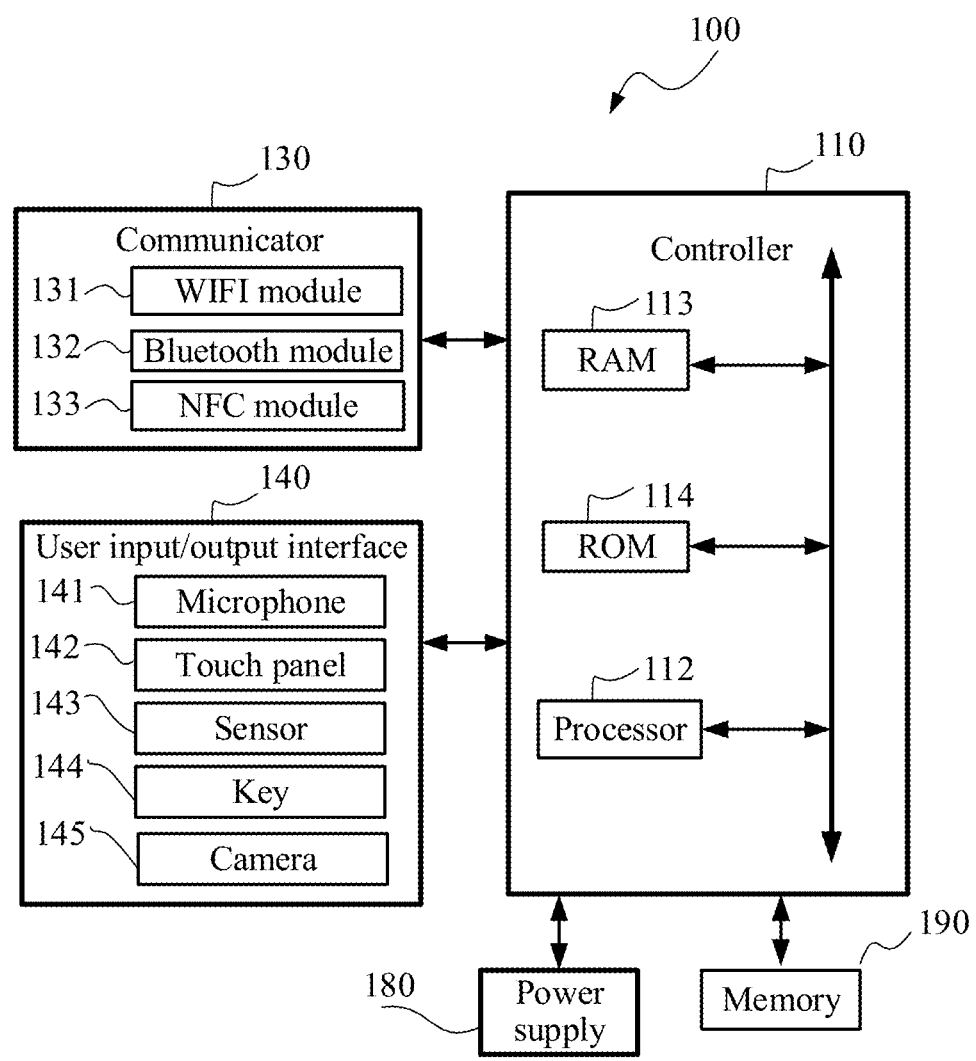
FIG. 2 shows a configuration block diagram of the control device 100 according to some embodiments.

FIG. 2 shows a configuration block diagram of the control device 100 according to an exemplary embodiment. As shown in FIG. 2, the control device 100 includes a controller 110, a communicator 130, a user input/output interface 140, a memory 190, and a power supply 180.

The control device 100 is configured to control the display apparatus 200, receive the input operation commands from the user, and convert the operation commands into commands that can be recognized and responded by the display apparatus 200, serving as an intermediary between the user and the display apparatus 200. For example, the user operates the channel +/− keys on the control device 100, and the display apparatus 200 responds to the commands corresponding to the channel +/− operations.

In some embodiments, the control device 100 may be a smart device. For example, the control device 100 may install various applications for controlling the display apparatus 200 according to user's requirements.

In some embodiments, as shown in FIG. 1, the mobile terminal 100B or another smart electronic device installing with an application for controlling the display apparatus 200 may serve as the control device 100. For example, the user may provide various function keys or icons of the graphical user interface on the mobile terminal 100B or another smart electronic device by installing applications, to realize the functions of the physical keys of the control device 100.

The controller 110 includes a processor 112, an RAM 113, an ROM 114, a communication interface, and a communication bus. The controller 110 is used to control the running and operations of the control device 100, and the communication cooperation among internal components as well as the external and internal data processing functions.

The communicator 130 is configured to communicate control signals and data signals with the display apparatus 200 under the control of the controller 110. For example, the received user input signal is sent to the display apparatus 200. The communicator 130 may include at least one of communication modules such as a WIFI module 131, a Bluetooth module 132 and an NFC module 133.

In the user input/output interface 140, the input interface includes at least one of a microphone 141, a touch panel 142, a sensor 143, a key 144, a camera 145 and other input interfaces. For example, the user may input the operation command through voice, touch, gesture, press and other actions, and the input interface converts the received analog signal to a digital signal, converts the digital signal to a corresponding command signal, and sends it to the display apparatus 200.

The output interface includes an interface sending the received user command to the display apparatus 200. In some embodiments, it may be an infrared interface or a radio frequency interface. For example, in the case of infrared signal interface, the user input command is converted into an infrared control signal according to the infrared control protocol and sent to the display apparatus 200 via the infrared sending module. As another example, in the case of radio frequency signal interface, the user input command is converted into a digital signal, modulated according to the radio frequency control signal modulation protocol, and then sent to the display apparatus 200 via the radio frequency sending module.

In some embodiments, the control device 100 includes at least one of the communicator 130 and the output interface. The communicator 130, such as WiFi, Bluetooth, NFC or other module, is configured to encode the user input command through the WiFi protocol or Bluetooth protocol or NFC protocol and send it to the display apparatus 200.

The memory 190 is configured to store various operating programs, data and applications that drive and control the control device 100 under the control of the controller 110. The memory 190 may store various kinds of control signal commands input from the user.

The power supply 180 is configured to provide power supply for all electrical elements of the control device 100 under the control of the controller 110. The power supply 180 can supply power through a battery and related control circuits.

Figure 3A:
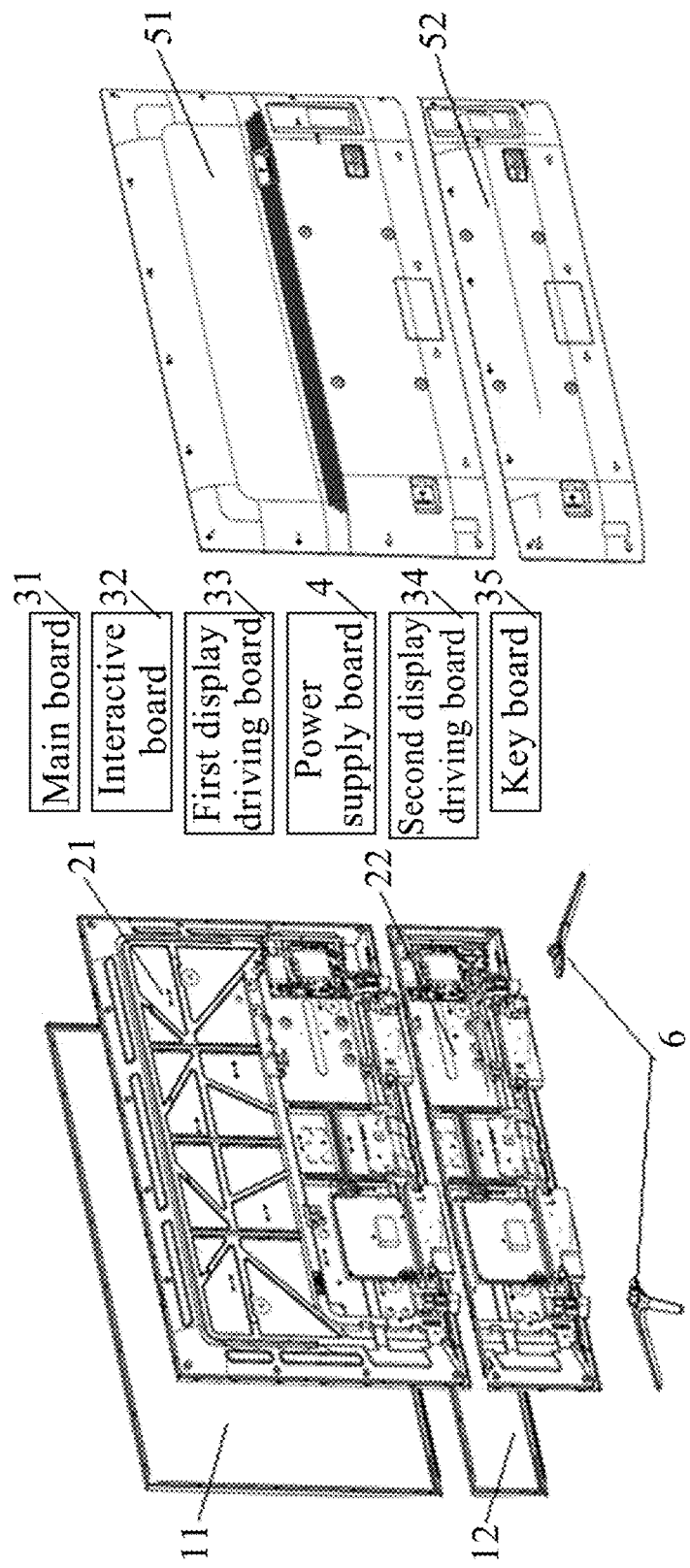
FIG. 3A shows a schematic diagram of the hardware structure of a hardware system in the display apparatus 200 according to some embodiments.

In some embodiments, FIG. 3A shows a schematic diagram of the hardware structure of a hardware system in the display apparatus 200 according to an exemplary embodiment. For ease of description, the display apparatus 200 in FIG. 3A is a liquid crystal display as an example for illustration.

As shown in FIG. 3A, the display apparatus 200 may include: a first panel 11, a first backlight assembly 21, a main board 31, an interactive board 32, a first rear shell 51, a first controller, a second controller, a first display driving board 33, a second panel 12, a second backlight assembly 22, a second display driving board 34, a power supply board 4, a second rear shell 52, a key board 35, a supporting member, a display driving circuit and a power supply assembly. Furthermore, in some embodiments, the display apparatus 200 may further include a base or a suspension support. For ease of description, the display apparatus 200 in FIG. 3A is illustrated by including a base 41 for supporting the display apparatus 200. It should be noted that only one form of base design is shown in this figure, and those skilled in the art can design different forms of bases according to product requirements.

Here, the first panel 11 is configured to present an image on the first display screen 201 to a user. In some embodiments, the first panel 11 may be a liquid crystal panel. For example, the liquid crystal panel may include, from top to bottom, a horizontal polarizing plate, a color filter, a liquid crystal layer, a Thin Film Transistor (TFT) array, a vertical polarizing plate, a light guide plate, and a Printed Circuit Board (PCB) on which drive circuits such as a gate drive circuit and a source drive circuit are arranged, wherein the gate drive circuit is connected to the gate of the thin film transistors through scan lines, and the source drive circuit is connected to the drain of the thin film transistors through data lines.

Here, the first backlight assembly 12 is located below the first panel 11, and usually includes some optical components for supplying the sufficient brightness and uniformly distributed light sources, to allow the first panel 11 to display normally. The first backlight assembly 12 also includes a first backplane (not shown in the figure).

Here, the first rear shell 13 houses the first panel 11 to cover the first backlight assembly 12, the first controller 14, the second controller 15, the first display driving circuit 16, the power supply assembly 30 and other parts of the display apparatus 200, achieving an aesthetic effect.

Here, the first controller 14, the second controller 15, the first display driving circuit 16 and the power supply assembly 30 are arranged on the first backplane. Usually, some bump structures are usually formed by stamping on the first backplane. The first controller 14, the second controller 15, the first display driving circuit 16 and the power supply assembly 30 are fixed on the bump structures by screws or hooks.

In some embodiments, the first controller 14, the second controller 15, the first display driving circuit 16 and the power supply assembly 30 may be arranged on one board together or may be arranged on different boards, for example, the first controller 14 is arranged on the main board, the second controller 15 is arranged on the interactive board, the first display driving circuit 16 is arranged on the first display drive board, and the power supply assembly 30 is arranged on the power supply board. They may also be arranged on different boards by combination, or may be arranged on a board together with the first backlight assembly 12. The specific setting can be performed according to actual needs, which is not limited in the disclosure.

For ease of description, the first controller 14, the second controller 15, the first display driving circuit 16 and the power supply assembly 30 are all arranged on one board in FIG. 3A for illustration.

Here, the main function of the first display driving circuit 16 is to perform the thousand-level backlight partition control through the backlight driving signal (such as a PWM signal and a Local dimming signal) transmitted from the first controller 14. This part of control changes according to the image content. The VbyOne display signal sent from the first controller 14 is received after the handshake is established between the first display driving circuit 16 and the first controller 14, and the VbyOne display signal is converted into an LVDS signal to realize the image display of the first display screen 201. The base 41 is used to support the display apparatus 200. It should be noted that only one form of base design is shown in this figure, and those skilled in the art can design different forms of bases according to product requirements.

Here, the second panel 21 is used to present an image on the second display screen 202 for a user. In some embodiments, the second panel 21 may be a liquid crystal panel, and the specific structure can refer to the description of the foregoing content, which will not be repeated here.

Here, the second backlight assembly 22 is located below the second panel 12, and usually includes some optical components for supplying the sufficient brightness and uniformly distributed light sources, to allow the second panel 12 to display normally. The second backlight assembly 22 further includes a second backplane (not shown in the figure).

Here, the second rear shell 23 houses the second panel 21 to cover the second backlight assembly 22, the second display driving circuit 24 and other parts of the display apparatus 200, achieving an aesthetic effect.

Here, the second display driving circuit 24 is arranged on the second backplane, and some bump structures are usually stamped on the second backplane. The second display driving circuit 24 is fixed on the bump structures by screws or hooks. The second display driving circuit 24 may be separately arranged on a board, such as a second display driving board, or may be arranged on the same board together with the second backlight assembly 22. The specific setting can be performed according to actual needs, which is not limited in the disclosure. For ease of description, the second display driving circuit 24 is arranged on a separate board in FIG. 3A for illustration.

In some embodiments, FIG. 3A also includes a button board, which may be arranged on the first backplane or the second backplane, which is not limited in the disclosure. A plurality of buttons and button circuits are provided on the button board, to allow the first controller 14 or the second controller 15 to receive button signals from the button board, and also to allow the first controller 14 or the second controller 15 to send control signals to the button board.

Furthermore, the display apparatus 200 also includes a sound reproduction device (not shown in the figure), e.g., an audio component, such as I2S interface including a power amplifier (AMP) and a speaker, for realizing the reproduction of sound. Generally, the audio component can achieve at least two channels of sound output. In order to achieve a surrounding sound effect, multiple audio components are required to output multiple channels of sound, which will not be described in detail here.

It should be noted that the display apparatus 200 can also be an OLED display. Accordingly, the boards included in the display apparatus 200 are changed accordingly. For example, since the OLED display is self-lit, backlight assemblies (the first backlight assembly 12 and the second backlight assembly 22 in FIG. 3A) are not required in the OLED display screen, which will not be illustrated in detail here.

Figure 3B:
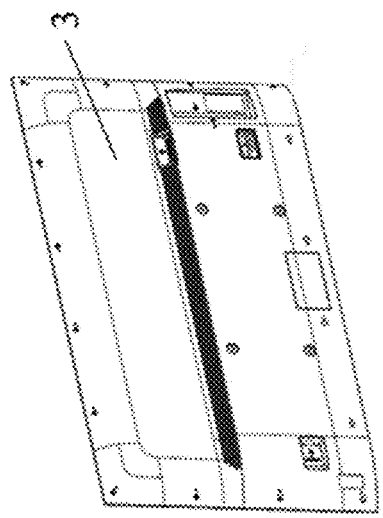
FIG. 3B shows a schematic diagram of the hardware structure of a hardware system in the display apparatus according to some embodiments.
Figure 3B:
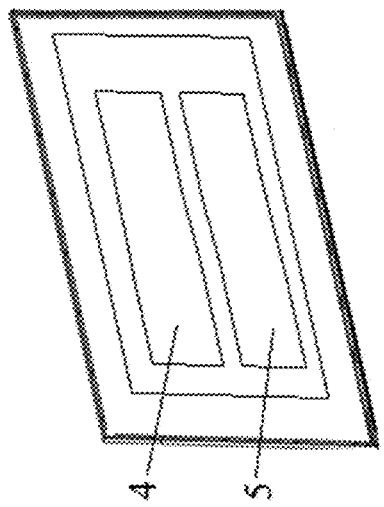
Figure 3B:
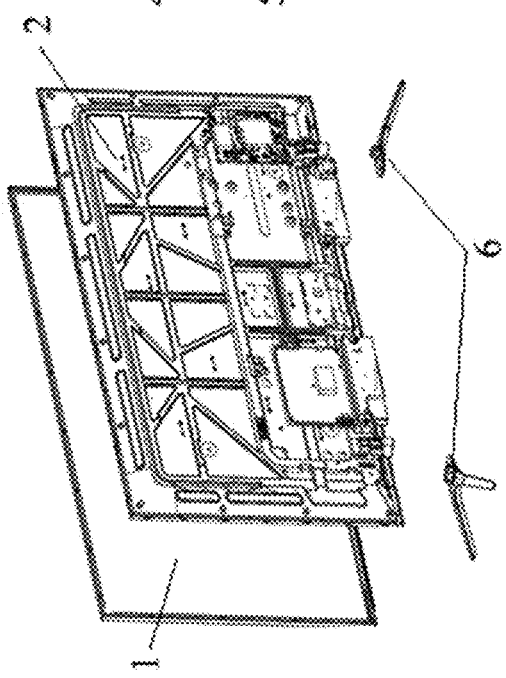

In FIG. 3A, the display apparatus with two display screens is taken as an example for illustration, while in FIG. 3B the display apparatus with single display screen is taken as an example for illustration.

FIG. 3B shows a schematic diagram of the hardware structure of a hardware system in the display apparatus according to an exemplary embodiment. The display apparatus with a single display screen as shown in FIG. 3 includes: a panel 1, a backlight assembly 2, a rear shell 3, a controller 4, a power supply assembly 5 and a base 6. The panel 1 is configured to present images for users. The backlight assembly 2 is disposed below the panel 1 and usually includes some optical components for supplying the sufficient brightness and uniformly distributed light sources to allow the panel 1 to display the image normally. The backlight assembly 2 includes a backplane, where the controller 4 and the power supply assembly 5 are arranged on the backplane. Some bump structures are usually formed by stamping on the backplane, and the controller 4 and the power supply assembly 5 are fixed on the bump structures by screws or hooks. The rear shell 3 houses the panel 1 to cover the backlight assembly 2, the controller 4, the power supply assembly 5 and other parts of the display apparatus, to allow the apparatus to have a nice appearance. The base 6 is configured to support the display apparatus.

Here, the controller 4 and the power supply assembly 5 may be separately arranged on a board, or may be arranged together on the same board, or may be arranged on the same board together with the backlight assembly. The specific arrangement can be implemented according to actual needs, which is not limited in the disclosure. For ease of description, the controller 4 and the power supply assembly 5 are arranged together on one board in FIG. 3B.

In some embodiments, the display apparatus 200 may also adopt an OLED display screen. In this way, the boards included in the display apparatus 200 change accordingly, which will not be illustrated in detail here.

Figure 4:
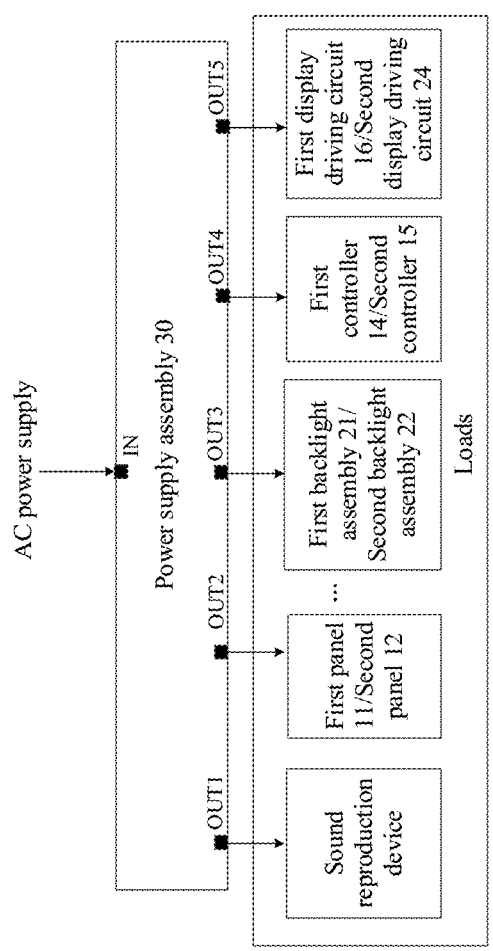
FIG. 4 shows a schematic diagram illustrating the connection between the power board and the load.

FIG. 4 shows a schematic diagram of the connection between the power board and the load. As shown in FIG. 4, the power supply assembly 30 includes an input terminal IN and an output terminal OUT (a first output terminal OUT1, a second output terminal OUT2, a third output terminal OUT3, a fourth output terminal OUT4 and the fifth output terminal OUT5 are shown in the figure). The input terminal IN is connected to an AC power supply (such as mains supply), and the output terminal OUT is connected to loads. For example, the first output terminal OUT1 is connected to a sound reproduction device, the second output terminal OUT2 is connected to the first panel 11/second panel 21, the third output terminal OUT3 is connected to the first backlight assembly 12/second backlight assembly 22, the fourth output terminal OUT4 is connected to the first controller 14/second controller 15, and the fifth output terminal OUT5 is connected to the first display driving circuit 16/second display driving circuit 24. Here, the power supply assembly 30 needs to convert the AC power into the DC power required by the loads. The DC power usually has different specifications, for example, 18V required by the audio component, 12V/18V required by the first controller 14, and so on.

For ease of description, a hardware system in the two hardware system architecture is referred to as the first hardware system or first chip; and the other hardware system is referred to as the second hardware system or second chip. The first hardware system includes various processors and various interfaces in the first controller, and various modules connected to the first controller through various interfaces. The second hardware system includes various processors and various interfaces in the second controller, and various modules connected to the second controller through various interfaces.

The first hardware system and the second hardware system can be respectively installed with a relatively independent operating system, and the operating system of the first hardware system and the operating system of the second hardware system may communicate with each other based on communication protocols. Exemplarily, the framework layer of the operating system of the first hardware system and the framework layer of the operating system of the second hardware system can communicate with each other for command and data transmission, to allow the display apparatus 200 to have two independent but interrelated subsystems.

Figure 5:
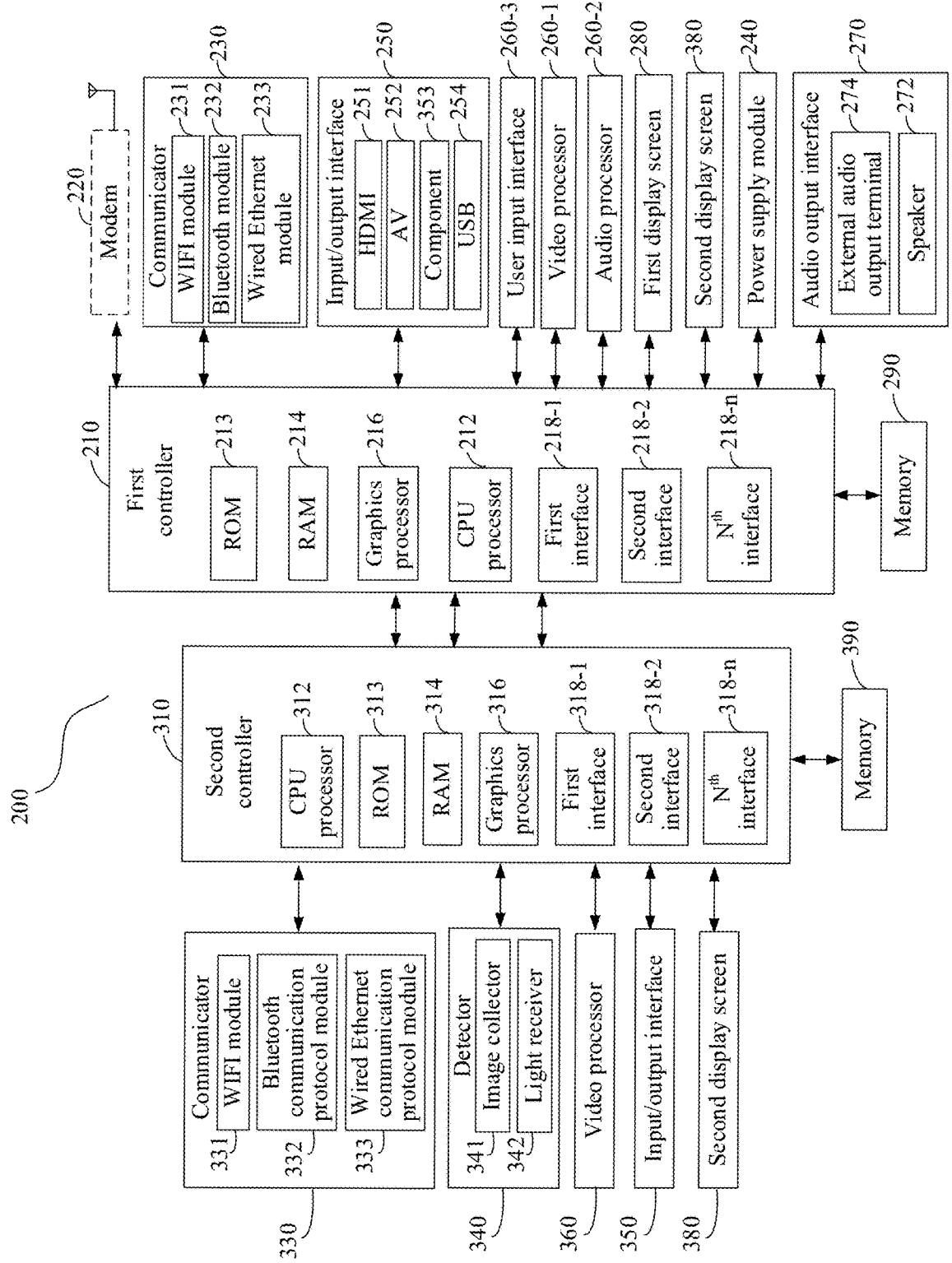
FIG. 5 shows a block diagram of the hardware architecture of the display apparatus 200 shown in FIG. 3A.

The two hardware system architecture of the disclosure will be illustrated below in some embodiments with reference to FIG. 5. It should be noted that FIG. 5 is merely an exemplary description of the two hardware system architecture of the disclosure, and does not intend to limit to the embodiments in the disclosure. In practical applications, both hardware systems can include more or less hardware or interfaces as required.

FIG. 5 shows a block diagram of the hardware architecture of the display apparatus 200 shown in FIG. 3A. As shown in FIG. 5, the hardware system of the display apparatus 200 includes a first controller 210, a second controller 310, and modules connected to the first controller 210 or the second controller 310 through various interfaces.

In some embodiments, the second controller 310 may be configured to receive commands sent from the first controller 210 and control a second display screen 380 to display the corresponding images.

The modules connected to the first controller 210 may include a modem 220, a communicator 230, an input/output interface 250, a first controller 210, a memory 290, a user input interface 260-3, a video processor 260-1, an audio processor 260-2, a first display screen 280 (that is, the first display screen 201 in FIG. 1), an audio output interface 270, and a power supply module 240. In other embodiments, the first chip may also include more or less modules connected to the first controller 210.

Here, the modem 220 receives the broadcast television signals in a wired or wireless manner, and may perform the amplification, frequency mixing, resonance and other modulation/demodulation processing, to demodulate the television audio/video signals carried in the frequency of the television channel selected by the user from multiple wireless or wired broadcast television signals, as well as the EPG data signals. According to different television signal broadcasting formats, the modem 220 may receive signals in many types of approaches, such as: terrestrial digital television, cable broadcasting, satellite broadcasting, or Internet broadcasting or the like; according to different modulation types, the digital modulation mode or analog modulation mode may be used; and according to different types of received television signals, the analog signals and digital signals may be used.

The modem 220 may respond to the television signal frequency selected by the user and the television signal carried by the frequency according to the user's selection under the control of the controller 210.

In some other exemplary embodiments, the modem 220 may also be in an external device, such as an external set-top box. In this way, the set-top box outputs television audio/video signals after modulation and demodulation, which are input to the display apparatus 200 through the input/output interface 250.

The communicator 230 is a component in communication with an external device or an external server according to various types of communication protocols. For example: the communicator 230 may be a WiFi chip 231, a Bluetooth communication protocol chip 232, a wired Ethernet communication protocol chip 233, another network communication protocol chip or near-field communication protocol chip, and an infrared receiver (not shown in the figure).

The display apparatus 200 may establish control signals and data signals connection with an external control device or content providing device through the communication interface 230. For example, the communicator may receive the control signal of the remote controller 100 under the control of the controller 210.

The input/output interface 250 transmits the data between the display apparatus 200 and other external devices under the control of the controller 210. The input/output interface 250 may be connected to external devices such as set-top box, game device, laptop, etc. in a wired/wireless manner, and may receive the data such as video signals (e.g., moving images), audio signals (e.g., music), additional information (e.g., EPG), etc. of the external devices.

Here, the input/output interface 250 may include but is not limited to: any one or more of a High-Definition Multimedia Interface (HDMI) interface 251, an analog or data high-definition component input interface 253, a composite video input interface 252, a USB input interface 254, and an RGB terminal (not shown in the figure), etc. The disclosure does not limit the number and type of input/output interfaces.

The controller 210 controls the operations of the display apparatus 200 and responds to the user's operations through various softwares stored in the memory 290.

As shown in FIG. 5, the controller 210 includes a Read Only Memory (ROM) 213, a Random Access Memory (RAM) 214, a graphics processor 216, a CPU processor 212, a communication interface 218, and a communication bus. The ROM 213, RAM 214, graphics processor 216, CPU processor 212 and communication interface 218 are connected through the bus.

The ROM 213 is used to store various system startup instructions. For example, when receiving a power-on signal, the power supply of the display apparatus 200 starts up, and the CPU processor 212 runs the system startup instructions in the ROM and copies the operating system stored in the memory 290 into the RAM 213 to start to run and initiate the operating system. When the startup of the operating system is completed, the CPU processor 212 then copies various applications in the memory 290 into the RAM 213, and then starts to run and initiate various applications.

The graphics processor 216 is used to generate various graphics objects, such as icons, operation menus, display graphics of user input instructions, etc. It includes an arithmetic unit, which performs the operations by receiving various interactive instructions input from users, and displays various objects according to the display attributes. And it includes a renderer, which generates the result of rendering various objects obtained based on the arithmetic unit, for displaying on the display screen 280.

The CPU processor 212 is used to execute the operating system and application instructions stored in the memory 290, and execute various applications, data and content according to various interactive instructions received from the outside so as to finally display and play various audio/video contents.

In some exemplary embodiments, the CPU processor 212 may include multiple processors. The multiple processors may include a main processor and one or more sub-processors. The main processor is used to perform some operations of the display apparatus 200 in the pre-power-up mode, and/or the operations of the display picture in the normal mode. One or more sub-processors are used to perform an operation in the standby mode or other states.

The communication interface 218 may include a first interface 218-1 to an $n^{th}$ interface 218-n. These interfaces may be network interfaces connected to external devices via a network.

The first controller 210 may control operations of the display apparatus 200 related to the first display screen 280. For example, in response to receiving user commands for select the UI objects displayed on the first display screen 280, the first controller 210 will perform operations related to an object selected by user commands.

The first controller 210 may control operations of the display apparatus 200 related to the second display screen 380. For example, in response to receiving user commands for select the UI objects displayed on the second display screen 380, the first controller 210 will perform operations related to an object selected by user commands.

Here the object can be any one of objects available for selection, such as a hyperlink or an icon. The operations related to selected objects for example include: operations for displaying a hyperlinked page, document or image, or operations for launching applications corresponding to icons. User commands for selecting a UI object can be commands input from various input devices (for example, a mouse, a keyboard, a touch pad, etc.) connected to the display apparatus 200 or voice commands corresponding to voices from the user.

The memory 290 is configured to store various software modules for driving and controlling the display apparatus 200. For example, various software modules stored in the memory 290 include a basic module, a detection module, a communication module, a display control module, a browser module and various service modules.

Here, the basic module is an underlying software module for the signal communications among various hardware in the display apparatus 200 and sending the processing and control signals to the upper modules. The detection module is a management module for collecting various information from various sensors or user input interfaces and performing digital-to-analog conversion and analysis management. The voice recognition module includes a voice parsing module and a voice instruction database module. The display control module is a module for controlling the display 280 to display the image content, and can be used to play the information such as multimedia image content and UI interface. The communication module is a module for performing the control and data communications with external devices. The browser module is a module for performing the data communications among browsing servers. The service module is a module for providing various services and various applications.

Meanwhile, the memory 290 is further used to store received external data and user data, images of various items in various user interfaces, and visual effect of focus objects, etc.

The user input interface 260-3 is configured to send signals from a user to the first controller 210, or transmit signals output from the first controller 210 to the user. Exemplarily, the control device (for example, a mobile terminal or a remote controller) can send input signals, such as power on or power off signals, channel selection signals and volume adjustment signals, input from the user to the user input interface 260-3, and then transmit the input signals to the first controller 210 through the user input interface 260-3. Or, the control device can receive output signals such as audios, videos or data processed by the first controller 210 and output through the user input interface 260-3, and display the received output signals or output the received output signals in an audio or vibration form.

In some embodiments, the user can input commands to the graphical user interface (GUI) displayed on the first display screen 280, and the user input interface 260-3 receives user input commands through the graphical user interface (GUI). Or, the user can input user commands by inputting voices or gestures, then the user input interface 260-3 receive the user input commands through voices or gestures recognition by a sensor.

The video processor 260-1 is used to receive the video signal and perform the video processing such as decompression, decoding, scaling, noise reduction, frame rate conversion, resolution conversion, and image synthesis according to the standard codec protocol of the input signal, to obtain the signal that can be displayed or played directly on the first display screen 280.

Exemplarily, the video processor 260-1 includes a de-multiplexing module, a video decoding module, an image synthesis module, a frame rate conversion module, a display formatting module, etc.

Here, the de-multiplexing module is used to de-multiplex the input audio/video data stream, e.g., the input MPEG-2, and the de-multiplexing module de-multiplexes it into a video signal and an audio signal, etc.

The video decoding module is used to process the de-multiplexed video signal, including decoding and scaling, etc.

The image synthesis module, such as image synthesizer, is used to superimpose and mix the GUI signal generated by a graphics generator according to the user input or by itself with the scaled video image, to generate an image signal for display.

The frame rate conversion module is used to convert the frame rate of the input video, e.g., converting the input frame rate of 24 Hz, 25 Hz, 30 Hz, 60 Hz of the video into the output frame rate of 60 Hz, 120 Hz or 240 Hz. Here the input frame rate may be related to the source video stream, and the output frame rate may be related to the refresh rate of the display apparatus. The display formatting module is used to change the received video output signal after the frame rate conversion to a signal conforming to the display format, e.g., output an RGB data signal by changing the format of the signal output from the frame rate conversion module.

The first display screen 280 is used to receive the image signals input from the video processor 260-1, and display the video content and images as well as the menu control interface. The first display screen 280 includes a display component configured to display images and a driving component configured to drive image display. The displayed video can be videos in the broadcast signals received from modem 220, and can also be video input from the communicator or the external device interface. The first display screen 280 can simultaneously display the user control interface (UI) generated in the display apparatus 200 and configured for controlling the display apparatus 200.

In some embodiments, there are different types of display. The first display screen 280 can further include a driving component for driving display. Or, if the first display screen 280 is a projection display, the first display screen 280 can further include a projection device and a projection screen.

The audio processor 260-2 is used to receive the external audio signal, and perform the processing such as decompression, decoding, noise reduction, digital-to-analog conversion and amplification according to the standard codec protocol of the input signal, to obtain the sound signal that can be played in the speaker 272.

The audio output 270 is used to receive the sound signal output from the audio processor 260-2 under the control of controller 210, such as: a speaker 272; and may include an external audio output terminal 274 outputting to a sound device of an external device, such as: external audio interface or headphone interface, in addition to the speaker 272 in the display apparatus 200 itself.

In some other exemplary embodiments, the video processor 260-1 may include one or more chips. The audio processor 260-2 may also include one or more chips.

And, in some other exemplary embodiments, the video processor 260-1 and the audio processor 260-2 may be separate chips, or may be integrated into one or more chips together with the first controller 210.

The power supply module 240 provides the power supply support for the display apparatus 200 through the power input from an external power supply under the control of the first controller 210. The power supply may include a built-in power supply circuit installed inside the display apparatus 200, or may be a power supply installed outside the display apparatus 200, and a power interface of the external power supply is provided in the display apparatus 200.

Similar to the first controller 210, as shown in FIG. 5, the modules connected to the second controller 310 may include a communicator 330, a detector 340, a memory 390, and a second display screen 380 (that is, the second display screen 202 in FIG. 1). In some embodiments, it may also include a user input interface, a video processor, an audio processor, a display screen, and an audio output interface (not shown in the figure). In some embodiments, there may also be a power supply module (not shown in the figure) that independently supplies power to the second controller 310.

The communicator 330 is a component in communication with an external device or an external server according to various types of communication protocols. For example, the communicator 330 may include a WIFI module 331, a Bluetooth communication protocol module 332, a wired Ethernet communication protocol module 333, an infrared communication protocol module, and other network communication protocol modules or near-field communication protocol modules (not shown in the figure).

The communicator 330 has interactions with the communicator 230 of the first hardware system. For example, the WiFi module 231 in the hardware system including the first controller 210 is used to connect to an external network and establish the network communication with an external server or the like. The WiFi module 331 in the hardware system including the second controller 310 is configured to connect to the WiFi module 231 of the hardware system including the first controller 210, instead of being directly connected with an external network. The hardware system including the second controller 310 connects to the external network through the hardware system including the first controller 210. Therefore, for the user, a display apparatus in the above embodiment can display information of one WiFi account available for use.

The detector 340 is a component for collecting signals about external environment or interactions with outside. The detector 340 can include an optical receiver 342 which is a sensor for collecting ambient light intensity and the display parameters can adapt according to the collected ambient light. Further, the detector 340 can include an image collector 341, such as a camera, a webcam and the like. The image collector 341 is configured to collect external environment scenes, collect user attribute or gestures of the user, so that the display parameters can change accordingly and user gestures can be recognized, to allow the interactions with users.

The input/output interface 350 is component for data transmission between the hardware system including the second controller 310 and the hardware system including the first controller 210 or other external devices. The input/output interface can be connected with external devices such as a set top box, a gaming device and a notebook computer in a wired/wireless manner.

The video processor 360 is configured to process related video signals.

The second controller 310 controls the operation of the display apparatus 200 and responds to the operation of the user through running various software control programs (such as third-party applications) stored on the memory 390 and through interaction with first controller 210.

As shown in FIG. 5, the second controller 310 includes a Read Only Memory (ROM) 313, a Random Access Memory (RAM) 314, a graphics processor 316, a CPU processor 312, a communication interface 318, and a communication bus, wherein the ROM 313, RAM 314, graphics processor 316, CPU processor 312, and communication interface 318 are connected through the communication bus.

The ROM 313 is configured to store various system startup instructions. The CPU processor 312 runs the system startup instructions in the ROM, and copies the temporary data stored in the operating system of the memory 390 to an RAM 314, to run or start an operating system. After the operating system is started, the CPU processor 312 copies temporary data of various applications in the memory 390 to the RAM 314, to run or launch various applications.

The CPU processor 312 is configured to run operating systems and application instructions stored in the memory 390, perform communication, signal, data, instruction and other transmission and interaction with chip N, and run various applications, data and contents according to received various interactive instructions input externally, to finally display and play various audio and video contents.

There are a plurality of communication interfaces 318, which may include a first interface 318-1 to an $n^{th}$ interface 318-n. These interfaces may be network interfaces connected to external devices via a network, or may be network interfaces connected to the hardware system including the first controller 210 via the network.

The second controller 310 is able to control the overall operation of the display apparatus 200. For example, in response to receiving the user commands for selecting the UI objects displayed on the second display screen 380, the second controller 310 will perform operations related to the object selected by the user's commands.

The second controller 310 may control operations of the display apparatus 200 related to the first display screen 280. For example, in response to receiving the user commands for selecting the UI objects displayed on the first display screen 280, the second controller 310 may perform the operations related to the object selected by the user command.

The graphics processor 316 is configured to generate various graphic objects, such as icons, menus for operation and display graphics for user instruction input, etc. An arithmetic unit is included, and the arithmetic unit operates through receiving various interactive instructions input from the user, and displays various objects according to display attributes. A renderer is included, and the renderer is configured to generate various objects obtained based on the arithmetic unit, and display the rendered results on the second display screen 380.

Both the graphics processor 316 of the second controller 310 and the graphics processor 216 of the first controller 210 can generate various graphics objects. If application 1 is installed in the chip including the second controller 310, and application 2 is installed in the chip including the first controller 210, when the user is on an interface of application 1, and the user inputs instructions for application 1, then the graphics processor 316 in the chip including the second controller 310 generates graphic objects. When the user is on an interface of application 2, and the user inputs instructions for application 2, the graphics processor 216 in chip including the first controller 210 generates graphic objects.

Figure 6:
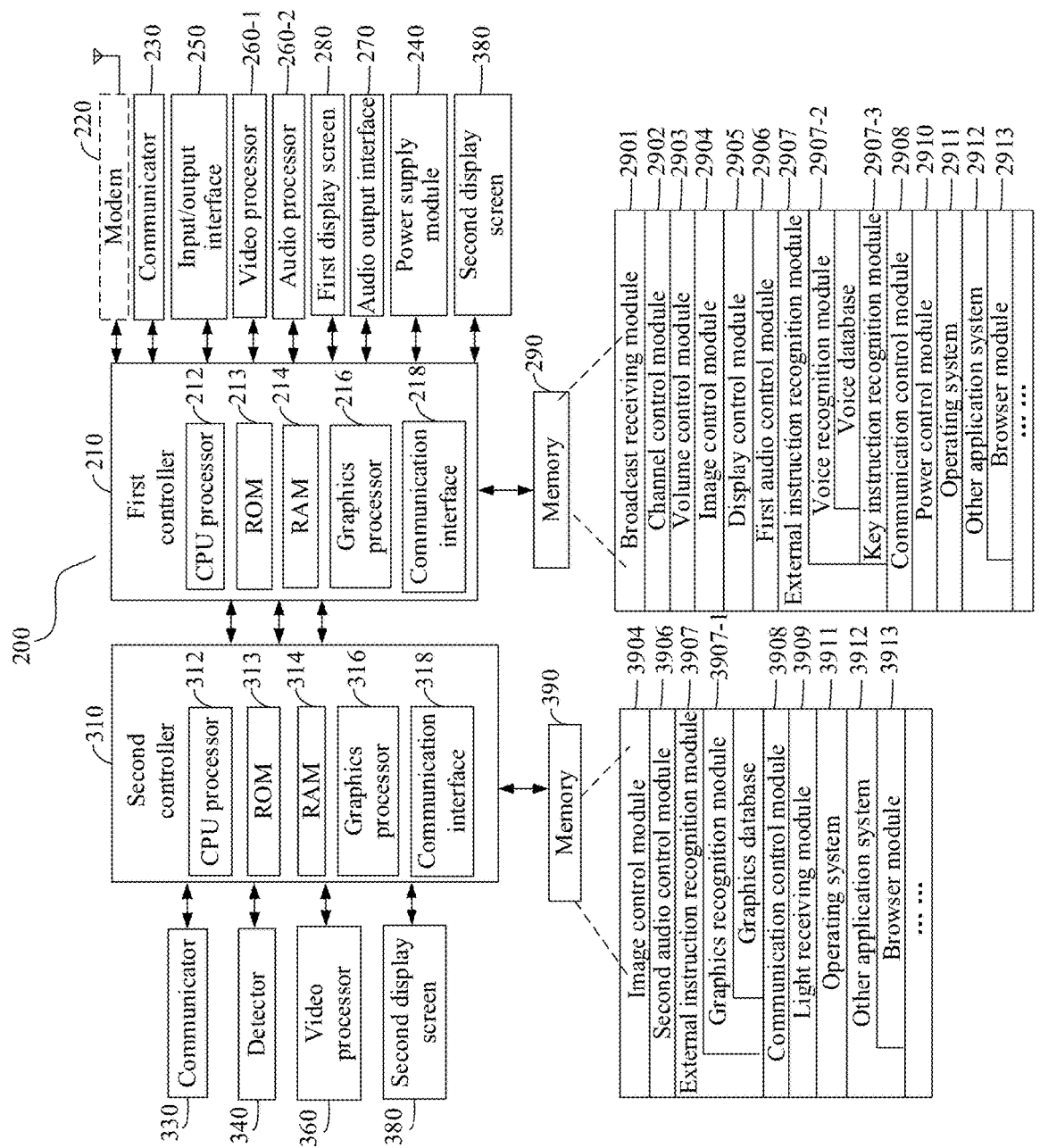
FIG. 6 shows a schematic diagram of the functional configuration of the display apparatus according to some embodiments.

FIG. 6 shows a schematic diagram of the functional configuration of the display apparatus according to an exemplary embodiment.

As shown in FIG. 6, the memory 390 of the hardware system including the second controller 310 and the memory 290 of the hardware system including the first controller 210 are respectively used to store the operating systems, applications, content and user data and the like, and drive the systems of the first display screen 280 and the second display screen 380 and respond to various operations from users under the control of the second controller 310 and the first controller 210. The memory 390 and the memory 290 may include volatile and/or nonvolatile memories.

For the first controller 210, the memory 290 is configured to store the programs for driving the first controller 210 in the display apparatus 200 to run, and stores various applications in the display apparatus 200, various applications downloaded by the user from external devices, various graphical user interfaces related to the applications, various objects related to the graphical user interfaces, user data information, and various internal data supporting the applications. The memory 290 is used to store a kernel, a middleware, applications and other system software of an operating system (OS), and store input video data and audio data, and other user data.

The memory 290 is specifically used to store the drive programs and related data of the video processor 260-1, the audio processor 260-2, the first display screen 280, the communicator 230, the modem 220, the input/output interface, etc.

In some embodiments, the memory 290 can store software and/or programs, and software applications for an operating system (OS) include: for example, a kernel, a middleware, an application interface (API) and/or applications. Exemplarily, the kernel is used to control or manage system resources, or functions implemented by other programs (for example, the middleware, the API or applications). The kernel provides an interface, to allow the middleware and the API or applications to access the controller, to control or manage system resources.

Exemplarily, the memory 290 includes a broadcast receiving module 2901, a channel control module 2902, a volume control module 2903, an image control module 2904, a display control module 2905, a first audio control module 2906, an external instruction recognition module 2907, a communication control module 2908, a light receiving module 2909, a power control module 2910, an operating system 2911, other applications 2912, a browser module 2913, etc. Through running various software applications in the memory 290, the first controller 210 performs broadcast television signal reception and demodulation, television channel selection control, volume selection control, image control, display control function, audio control, external instruction recognition, communication control, optical signal reception, power control, software control platforms supporting various functions, and browser function.

The memory 390 is configured to store various software modules for driving and controlling the display apparatus 200. For example, various software modules stored in the memory 390 include a basic module, a detection module, a communication module, a display control module, a browser module and various service modules. Since the functions of the memory 390 are similar to the functions of the memory 290, the related parts of the memory 390 can refer to the description for the memory 290 and will omit herein.

Exemplarily, the memory 390 includes an image control module 3904, an audio control module 3906, an external instruction recognition module 3907, a communication control module 3908, an optical receiving module 3909, an operating system 3911 and other applications 3912 and a browser module 3913, etc. Through running various software applications in the memory 390, the controller 310 performs such functions as image control, display control, audio control, external instruction recognition, communication control, optical signal reception, power control, software control platforms supporting various functions, and browser function.

As for the difference, the external instruction recognition module 2907 in the hardware system including the first controller 210 and the external instruction recognition module 3907 in the hardware system including the second controller 310 can recognize different commands.

Exemplarily, since an image receiving device such as a camera is connected with the hardware system including the second controller 310, the external instruction recognition module 3907 can include an image recognition module 3907-1. The image recognition module 3907-1 stores a graphic database, when the camera receives external graphic commands, the received graphic commands are matched with the instructions in the graphic database, to control the display apparatus according to commands. Since the voice receiving device and the remote control are connected with the hardware system including the first controller 210, the external instruction recognition module 2907 can include a voice recognition module 2907-2, the voice recognition module 2907-2 stores a voice database, when the voice receiving device receives external voice instructions, the received external voice instructions are matched with the instructions in the voice database, to control the display apparatus according to instructions. Similarly, the remote control and other control devices 100 are connected with the hardware system including the first controller 210, and instructions are interchanged between a button instruction recognition module and the control device 100.

Figure 7:
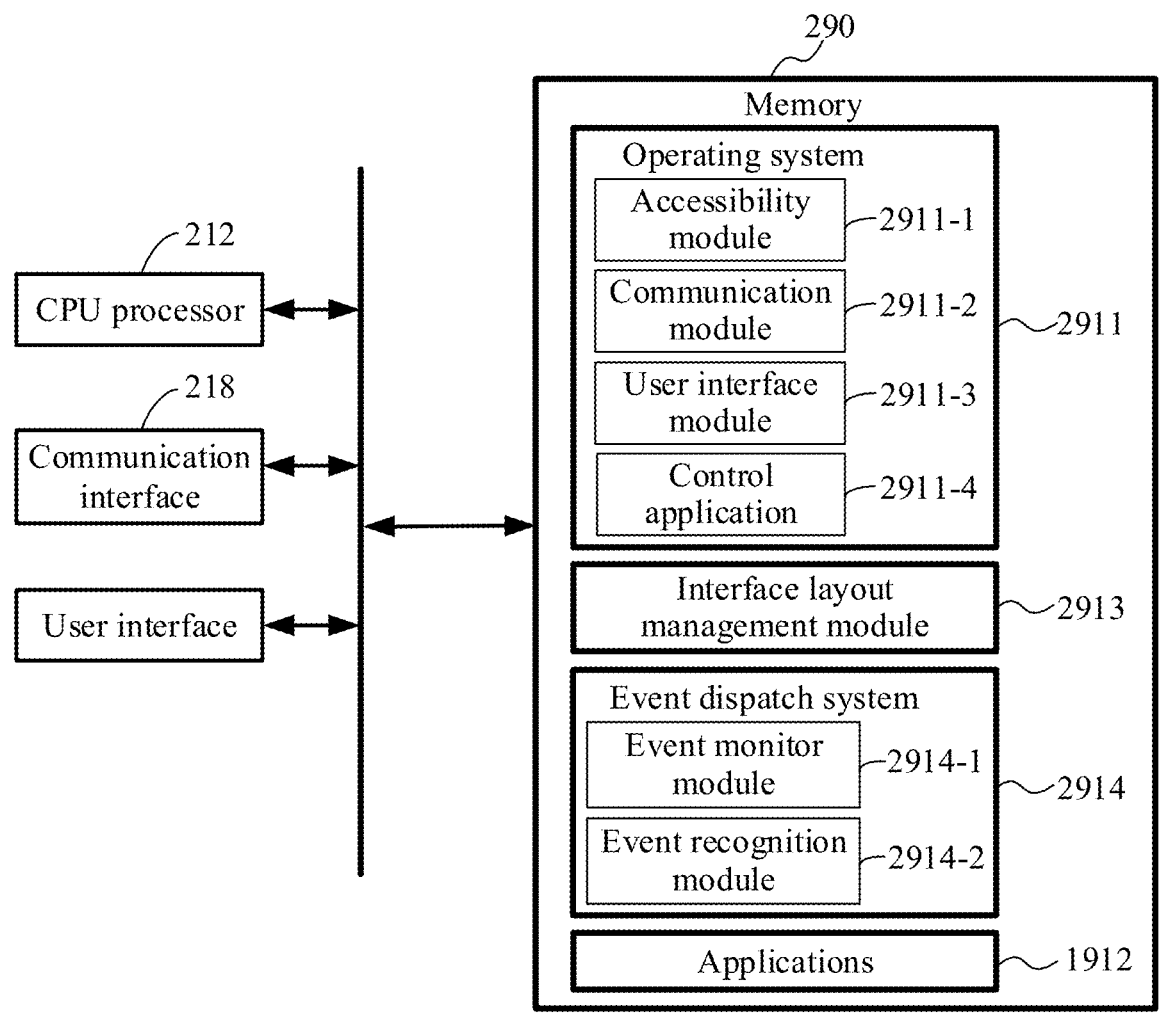
FIG. 7 shows a configuration block diagram of a software system in the display apparatus 200 according to some embodiments.

FIG. 7 shows a configuration block diagram of a software system in the display apparatus 200 according to an exemplary embodiment.

For the first controller 210, as shown in FIG. 7, the operating system 2911 includes operating software for processing various basic system services and performing hardware-related tasks, and serves as a medium completing the data processing between applications and hardware components.

In some embodiments, part of the kernel of the operating systems includes a series of software for managing hardware resources of the display apparatus, and providing service to other applications or software codes.

In some other embodiments, part of kernel of the operating system includes one or more device drivers, which may be a set of software codes in the operating system and help to operate or control the devices or hardware associated with the display apparatus. The driver may include the codes for operations on the video, audio and/or other multimedia components. Exemplarily, the display screen, camera, Flash, WiFi and audio driver are included.

Here, an access module 2911-1 is configured to modify or access an application to realize the access of the application and the operations of the display content thereof.

A communication module 2911-2 is configured to connect with other peripheral devices via the related communication interfaces and communication networks.

A user interface module 2911-3 is configured to provide objects on the user interface, to allow access of various applications and operations for the user.

A control application 2911-4 is configured to manage the controllable processes, including the runtime application, etc.

The event dispatch system 2914 may be implemented in the operating system 2911 or the application 2912. In some embodiments, on the one hand, it is implemented in the operating system 2911, and simultaneously implemented in the application 2912. It is a processing program configured to monitor various user input events and designate the recognition results in response to various types of events or sub-events according to various events to implement one or more sets of predefined operations.

Here, an event monitor module 2914-1 is configured to monitor the events or sub-events input via the user input interface.

An event recognition module 2914-2 is configured to recognize various events or sub-events according to the definitions of various events input through various user input interfaces, and dispatch the events or sub-events to a processor to execute the corresponding one or more sets of processing programs.

Here, the events or sub-events refer to the inputs detected by one or more sensors in the display apparatus 200 and the inputs of the external control device (such as the control device 100, etc.), such as: various sub-events input by voice, gesture inputs recognized by gesture, and sub-events input by the remote control key commands of the control device, etc. Exemplarily, one or more sub-events in the remote controller include multiple forms, including but not limited to one or a combination of pressing the up/down/left/right key, pressing the OK key, pressing and holding the key and the like, as well as the operations of non-physical keys, such as moving, pressing, releasing, etc.

The interface layout management module 2913 is configured to directly or indirectly receive various user input events or sub-events monitored by the event dispatch system 2914, to update the layout of a user interface. The update includes but not limited to updating positions of respective controls or child controls on the interface, size or position of a container, and hierarchy, and various other operations related to interface layout.

Since the function of the operating system 3911 of the hardware system including the second controller 310 is relatively similar to that of the operating system 2911 of the hardware system including the first controller 210, the related parts refer to the operating system 2911 and will not be repeated here.

Figure 8:
FIG. 8 shows a schematic diagram of the application layer of the display apparatus according to some embodiments.

FIG. 8 shows a schematic diagram of the application layer of the display apparatus according to an exemplary embodiment. As shown in FIG. 8, the application layer of the display apparatus includes various applications that can be executed on the display apparatus 200.

The application layer 2912 may include, but is not limited to, one or more applications, such as: video-on-demand application, application center, game application, etc. The application layer 3912 may include, but is not limited to, one or more applications, such as: live television application, media center application, etc. It should be noted that applications included in the hardware system comprising the second controller 310 and the first controller 210 are determined according to the operating system and other designs, and the disclosure does not limit and classify the applications included therein.

The live television application can provide live television through different signal sources. For example, the live television application can provide television signals using input from cable television, radio broadcast, satellite service or other types of live television services. In addition, the live television application can display videos of live television signals on the display apparatus 200.

The video-on-demand application can provide videos from different storage sources. Different from the live television application, the video on demand provides video display from some storage sources. For example, the video on demand can come from a server side of cloud storage, and a local hard disk storage comprising stored video programs.

The media center application is an application which can play various multimedia contents. For example, the media center is different from live television or video on demand, and the user is able to access various images or services provided by audios through the media center application.

The application center may store various applications. The application may be a game application or some other applications that are related to the computer system or other devices but capable of running in the display apparatus. The application center can acquire these applications from different sources, and store them in the local memory, and then the applications can run on the display apparatus 200.

Since independent operating systems may be respectively installed in hardware systems comprising the second controller 310 and the first controller 210, there are two independent but interrelated subsystems in the display apparatus 200. For example, both the hardware systems including the second controller 310 and the first controller 210 can be independently installed with Android and various applications, so that each hardware system can implement certain functions, and also cooperate to realize a certain function.

Figure 9:
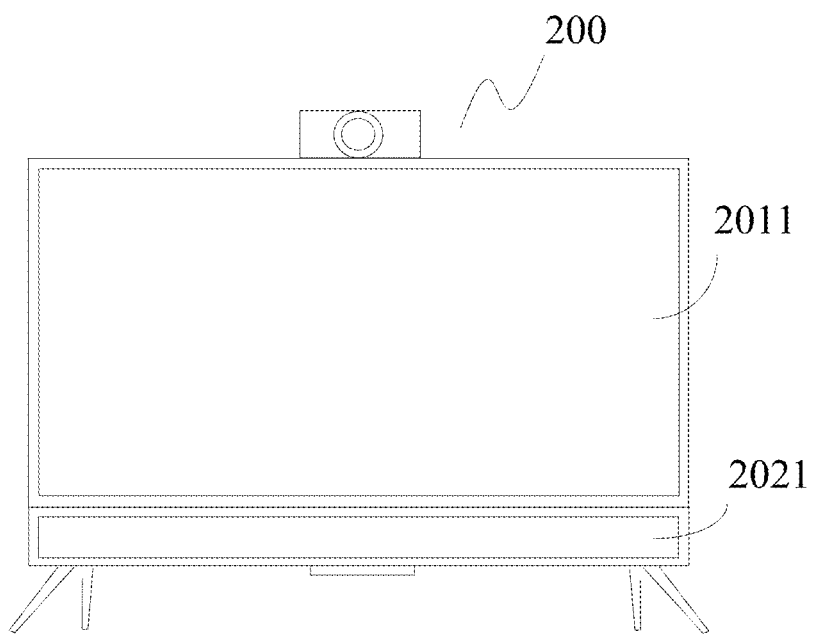
FIG. 9 shows a schematic diagram of the user interface in the display apparatus 200 according to some embodiments.

FIG. 9 shows a schematic diagram of the user interface in the display apparatus 200 according to an exemplary embodiment. As shown in FIG. 9, the user interface includes a first view display area 2011 and a second view display area 2021. The function implementations on the first view display area 2011 and the second view display area 2021 are basically the same. The following takes the first view display area 2011 as an example for illustration. For example, the first view display area 2011 includes one or more different layout items. And, the user interface further includes a selector for indicating the item being selected, and the position of the selector can be moved through user input, to select different items by changing the positions.

In some embodiments, the first view display area 2011 is a view display which can be scaled up or scaled down, meaning that the size of the first view display area 2011 on the screen or a proportion of the first view display area 2011 in the screen, or the size of the view display 201 on the screen or a proportion of the item in the view display 201 on the screen can be increased or decreased.

The "item" refers to a visual object displayed in the view display area of the user interface in the display apparatus 200 to represent the corresponding content such as icon, thumbnail, video clip, etc. For example, the item may represent the image content or video clip of a movie or teleplay, the audio content of music, an application, or other history information of the user access content.

Furthermore, the item may represent the display of an interface or a set of interfaces of the display apparatus 200 connected to an external device, or may represent the name of an external device connected to the display apparatus, and so on, such as: a set of signal source interfaces, or HDMI interface, USB interface, PC interface, etc.

It should be noted that the view display area can present the content of the video chat item or present the content of the application layer item (e.g., webpage video, Video on Demand (VOD) display, application image, etc.).

The "selector" is used to indicate that any item has been selected, such as: cursor or focus object. The selector is positioned according to the position of the icon or menu touched by the user in the display apparatus 200 for information input, so that the movement of the focus object can be displayed in the display apparatus 200 to select a control item, and one or more items can be selected or controlled.

The focus object refers to the object that moves between items according to the user input. Exemplarily, a bold line is drawn on the edge of the item to realize or identify the position of the focus object. In other embodiments, the focus form is not limited to the above examples and may be a tangible or intangible form (such as a cursor) that can be recognized by the user, for example, may be a 3D deformation of the item or other form, or the identifiers such as border line, size, color, transparency and outline and/or font of the text or image of the focus item may also be changed.

The event dispatch system 2914 can monitor the user input of each predefined event or sub-event, and directly or indirectly provide the interface layout management module 2913 with the control of the recognized event or sub-event.

The interface layout management module 2913 is configured to monitor the state of the user interface (including the position and/or size, change process, etc. of the view areas, item, focus or cursor object, etc.), and can modify the layout such as size, position and level of the view display area and/or adjust or modify the layout such as size or/and position, quantity, type and content of various items in the view display area according to the event or sub-event. In some embodiments, modifying and adjusting the layout includes: displaying or not displaying each view display area or the content of items in the view display area on the screen.

The user input interface is used to send the user's input signal to the controller or transmit the signal output from the controller to the user. Exemplarily, the control device (for example, a mobile terminal or a remote control) can send input signals, such as power on or power off signals, channel selection signals and volume adjustment signals, input from the user to the user input interface, and then transmit the input signals to the controller through the user input interface. Or, the control device can receive output signals such as audios, videos or data processed by the controller and output through the user input interface, and display the received output signals or output the received output signals in an audio or vibration form.

In some embodiments, the user may input a user command on the Graphical User Interface (GUI) displayed on the display screen 280, and the user input interface receives the user input command through the Graphical User Interface (GUI). Alternatively, the user may input a user command by inputting a particular sound or gesture, and the user input interface recognizes the sound or gesture through the sensor to receive the user input command.

The "user interface" is an interface for interaction and information exchange between applications or operating systems and users. It realizes the conversion between the internal form of information and the form acceptable to users. The commonly-used form of the user interface is Graphic User Interface (GUI), which refers to a user interface related to computer operations that is displayed in a graphical manner. It may comprise interface elements such as icon, window, control or the like displayed on the display screen of an electronic device, wherein the controls may include icon, button, menu, tab, text box, dialog box, status bar, navigation bar, Widget, and other visual interface elements.

On the basis of the foregoing embodiments, considering that the display of the related information of an object in the movie on the display screen blocks the movie image displayed on the display screen, embodiments of the disclosure provide a display apparatus, where the related information of the object is displayed on the second display screen, so as to avoid blocking the movie image being played and improve the user experience.

The display apparatus according to embodiments of the disclosure includes: a first display screen, a second display screen, a first controller in communication with the first display screen, and a second controller in communication with the second display screen, the first controller being in communication with the second controller. The display apparatus further includes a first communicator and a second communicator. The first controller is configured to receive information through a first communicator, and the second controller is configured to receive information through a second communicator. The first display screen and the second display screen are independent of each other, and two hardware control systems (the first controller and the second controller) are used between the first display screen and the second display screen.

Here, the first display screen is configured to display a first user interface.

The second display screen is configured to display a second user interface.

The first controller is configured to:
  obtain the information of a video image on the first user interface and send the information of the video image to a server through a first communicator, wherein the server is configured to obtain a search identifier of an object in the video image according to the information of the video image and send the search identifier to the second controller.

The second controller is configured to:
  receive the search identifier through a second communicator different from the first communicator and control the second display screen to display a third user interface, wherein the third user interface includes the search identifier of the object in the video image.

Exemplarily, when a video is shown on the first display screen, the first user interface may be any frame image in the video, the second user interface displays an image corresponding to the first user interface, and the second user interface may include a voice assistant, such as Xiaoju, which is used to perform the human-computer interaction with a user. Exemplarily, the second user interface may include the following scenario "Xiaoju is sitting on sofa and watching TV" to reflect the current state of the user. Of course, the second user interface may also be a standby interface, which may include information such as time, weather, temperature, location, etc. that are not related to the video image. Exemplarily, the second user interface includes current weather information: sunny, temperature: 10° C., time: Oct. 1, 2019, and location: Beijing. This embodiment does not limit the content on the second user interface.

Here, the information of the video image includes at least the video information and the play time of the video image. The video information includes at least the name of the video and the episode number corresponding to the video image, and the play time may be the display time of the video image in the video of this episode. For example: the video name is TV series AAA, the episode number corresponding to the video image is Episode 3, and the play time is 20 minutes and 50 seconds (the duration of the video of this episode may be 40 minutes).

After obtaining the information of a video image in the first user interface, the first controller sends the information of the video image to a server through a first communicator, where the server is configured to obtain a search identifier of an object in the video image according to the information of the video image and send the search identifier to the second controller.

Here, after obtaining the information of the video image, the server can firstly obtain the object in the video image according to the information of the video image. It should be understood that the object in the video image may be an object that can be identified in the video image.

Exemplarily, the object in the video image may be a person or an item. Here, the identifiable persons in the video image are characters in the video and actors who play the roles in the video. For example, an actor of movie AAA is Z, so the object in the video image of movie AAA is Z. The identifiable items in the video image are food, plants, animals, resorts, clothing, household items, sport equipment, musical instruments, cultural goods, electronic products, military weapons, vehicles, buildings, public facilities, etc. in the video. For example, if a scenic spot appears in the video, the object in the video image is the scenic spot.

After an identifiable object in the video image is obtained, the search identifier of the object is obtained. It should be understood that the search identifier of the object is an identifier based on which the search information of the object can be obtained by searching. The search identifier of the object may be in the form of image. The search identifier may be a graph of a browser link associated with the object, wherein the graph may include a graph associated with a link to a thumbnail of the object, a graph associated with a link to a big image of the object, a graph associated with a link to a URL of the object.

Here, the graph associated with a link to a thumbnail of the object can be a search identifier for the thumbnail of the object, such as the character name, the actor name, the name of the scenic spot corresponding to the building, the product name, etc.; the graph associated with a link to a big image of the object can be a search identifier for details of the object, such as character profile, actor profile, scenic spot profile, and product purchase link, etc.; and the graph associated with a link to a URL of the object can be a search identifier for pictures of the object, such as character picture, actor picture, product picture, scenic spot picture, etc.

After obtaining the search identifier of the object in the video image, the server can send each corresponding search identifier to the second controller. The second controller receives the search identifier through the second communicator and controls the second display screen to display a third user interface which includes the search identifier of the object in the video image.

Figure 10:
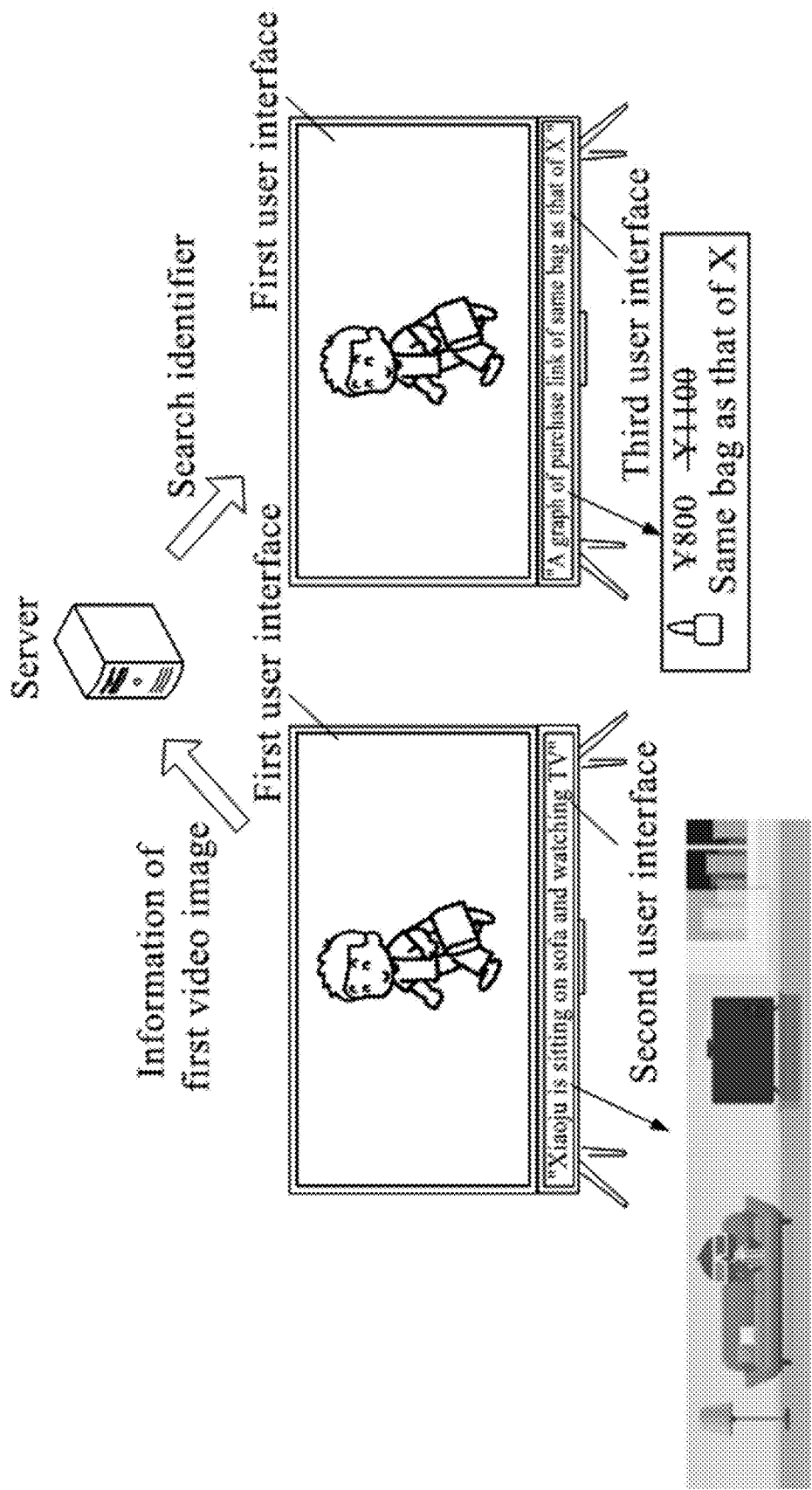
FIG. 10 is a first schematic diagram showing the interaction process of the display apparatus according to some embodiments.

FIG. 10 is a first schematic diagram of the interaction process of the display apparatus according to an exemplary embodiment of the disclosure. As shown in FIG. 10, the first display screen is configured to display the first user interface, and the second display screen is configured to display the second user interface. The first user interface includes a first video image which is a frame image displayed at 20 minutes and 50 seconds in Episode 3 of TV series AAA. The first controller sends the information of the first video image to the server, and the server identifies the objects in the picture, including X's bag. The second user interface may include the following scenario "Xiaoju is sitting on sofa and watching TV". Of course, the second user interface may also include information such as time, weather and location.

The first controller obtains the information of the first video image and sends the information of the video image to the server. The server obtains the search identifier of the object in the video image according to the information of the video image, where the search identifier is a graph of a purchase link of the same bag as that of X, and the graph of the link to the big picture includes the picture of the same bag as that of X, the original price and the current price. Then the server sends the search identifier to the second controller, and the second controller controls the second display screen to display the third user interface, wherein the third user interface includes the graph of the purchase link of the same bag as that of X.

It should be understood that, when there are a plurality of objects in the video image, the third user interface displayed on the second display screen can be controlled to include the link graph to thumbnail of the object or link graph to URL of the object for each search identifier in order to enable the third user interface displayed on the second display screen to include search identifiers of more objects, which will be described below with reference to FIG. 11 by taking the link graph to thumbnail or thumbnail link graph as an example.

Figure 11:
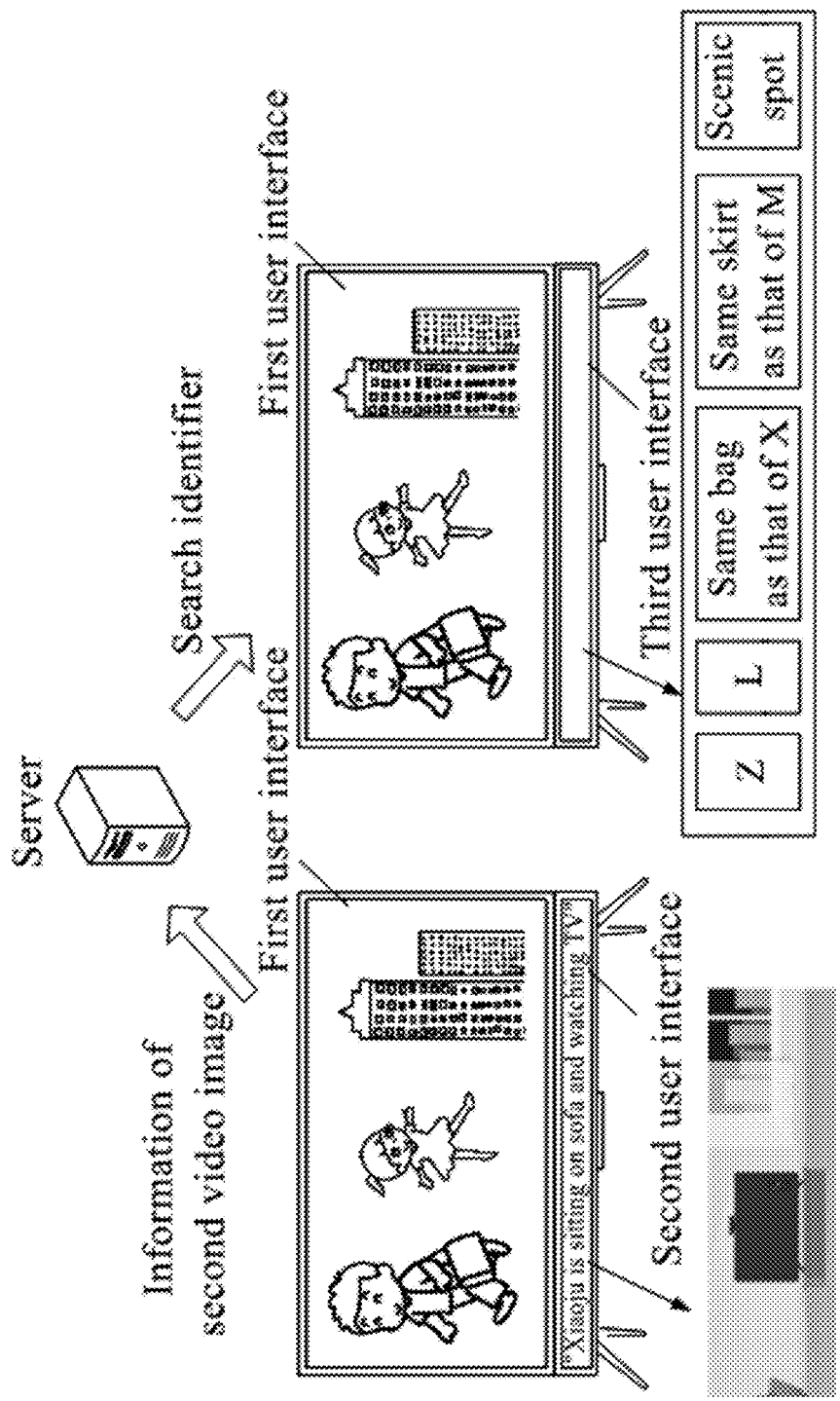
FIG. 11 is a second schematic diagram showing the interaction process of the display apparatus according to some embodiments.

FIG. 11 is a second schematic diagram of the interaction process of the display apparatus according to an exemplary embodiment of the disclosure. As shown in FIG. 11, the first display screen is configured to display the first user interface, and the second display screen is configured to display the second user interface. The first user interface includes a second video image which is the frame image displayed at 10 minutes and 20 seconds in Episode 4 of TV series AAA. The first controller sends the information of the second video image to the server, and the server identifies the objects in the picture, including X's bag, star Z playing X, star L playing M, M's skirt, X's mobile phone, and Building BB. The second user interface may include the following scene "Xiaoju is sitting on sofa and watching TV".

The first controller obtains the information of the second video image and sends the information of the second video image to the server. The server obtains the search identifiers of the objects in the second video image according to the information of the second video image, including: the actors Z and L, the same bag as that of X, the same skirt as that of M, the same mobile phone as that of X, and the scenic spot corresponding to Building BB.

Then, the server sends each search identifier to the second controller, and the second controller controls the second display screen to display a third user interface, wherein the third user interface includes the actors Z and L, the same bag as that of X, the same skirt as that of M, the same mobile phone as that of X, and the scenic spot.

Figure 12:
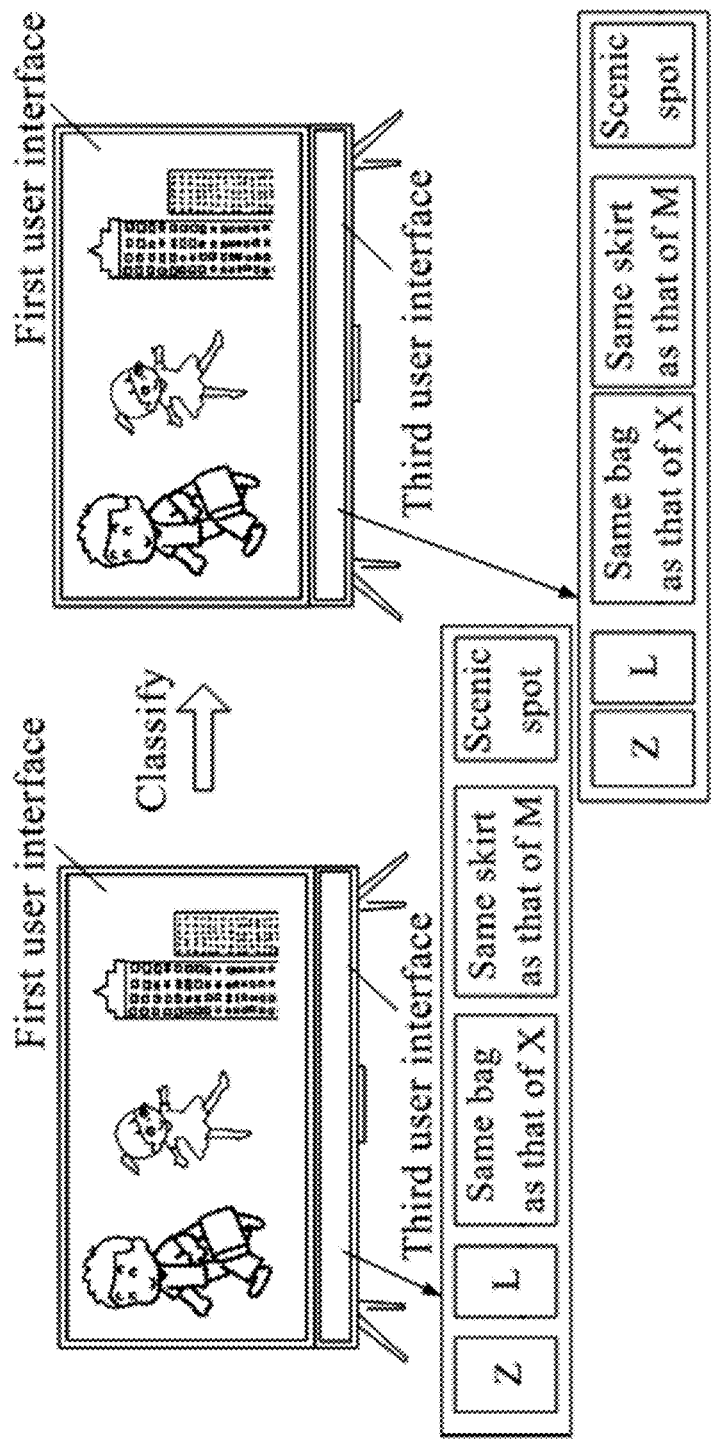
FIG. 12 is a third schematic diagram showing the interaction process of the display apparatus according to some embodiments.

In some exemplary embodiments, the server may also classify all search identifiers, which are exemplarily classified into clothing and jewelry information, drama information, star encyclopedia information, and scenic spots and foods corresponding to the location information. In order to facilitate users to view each search identifier on the third user interface, the server puts the search identifiers belonging to the same category together and sends them to the second controller, and the second controller controls the third user interface on the second display screen to arrange the search identifiers of the same category together for display. On the basis of FIG. 11, FIG. 12 is a third schematic diagram of the interaction process of the display apparatus according to an exemplary embodiment of the disclosure. As shown in FIG. 12, the server classifies all search identifiers into: actors Z and L; the same bag as that of X, the same skirt as that of M, and the same mobile phone as that of X; scenic spots. In some embodiments, when the search identifiers are displayed in the third user interface of the second display screen, the distance between different categories is set to be larger than the distance between search identifiers of the same category, thereby improving the user experience. This embodiment does not limit the specific classification method.

Of course, similar videos can also be pushed to the user according to the video image in this embodiment, and the search identifiers of the pushed videos can be displayed on the second display screen. The specific content can refer to the above-mentioned method, and will not be repeated here.

In some exemplary embodiments, the second controller is further configured to:
  control the second display screen to scroll the search identifiers if the number of the search identifiers is greater than a preset value.

Figure 13:
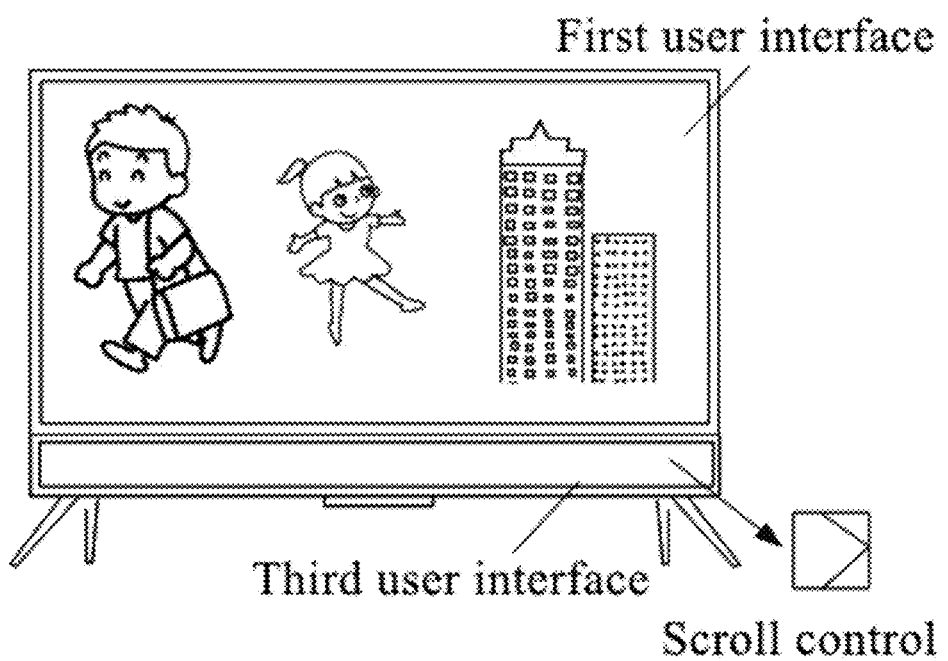
FIG. 13 is a third schematic diagram showing the interaction process of the display apparatus according to some embodiments.

FIG. 13 is a third schematic diagram of the interaction process of the display apparatus according to an exemplary embodiment of the disclosure. As shown in FIG. 13, when the number of search identifiers is greater than the preset value, the third user interface may also be provided with a scroll control. When the second controller receives an operation command for the scroll control, the second controller is further configured to control the third user interface displayed on the second display screen to scroll the search identifiers.

Here, the operation command for the scroll control can be implemented by voice or a remote control or a control panel of the second display screen. When the display duration of each search identifier reaches a preset duration, the second controller may control the second display screen to stop displaying the third user interface, but to display the second user interface. In this embodiment, the display duration and the preset value are not limited and can be determined according to the actual situation.

The display apparatus according to this embodiment includes: a first display screen, a second display screen, a voice acquisition device, a first controller in communication with the first display screen, and a second controller in communication with the second display screen. The first controller is in communication with the second controller. The first controller is configured to obtain the information of a video image in a first user interface and send the information of the video image to a server through a first communicator, wherein the server is configured to obtain a search identifier of an object in the video image according to the information of the video image and send the search identifier to the second controller. The second controller is configured to receive the search identifier through a second communicator and control the second display screen to display a third user interface, wherein the third user interface includes the search identifier of the object in the video image. In the disclosure, the pushed search identifier is displayed on the second display screen to avoid blocking the displaying interface on the first display screen.

In some exemplary embodiments, the first controller is further configured to:
  receive a control command for a selector through a user input interface, control the first display screen to remove the selector in response to the control command, and send the control command to the second controller.

The second controller is configured to:
  control the second display screen to display the selector, where the third user interface further includes the selector.

Here, the control command can be realized by voice or the remote control or the control panel of the second display screen. The first controller receives the control command for the selector through the user input interface, controls the first display screen to remove the selector (that is, remove the focus) in response to the control command, and sends the control command to the second controller. In response to the control command, the second controller controls the second display screen to display the selector, that is, the focus is on the second display screen, wherein the user can control the selector to switch back and forth among the search identifiers of the objects in the third user interface through voice input or the remote control or the control panel of the second display screen. Exemplarily, the focus item in the search identifier is identified by drawing a thick line or darkening color on the edge, to indicate that the search identifier is selected.

Figure 14:
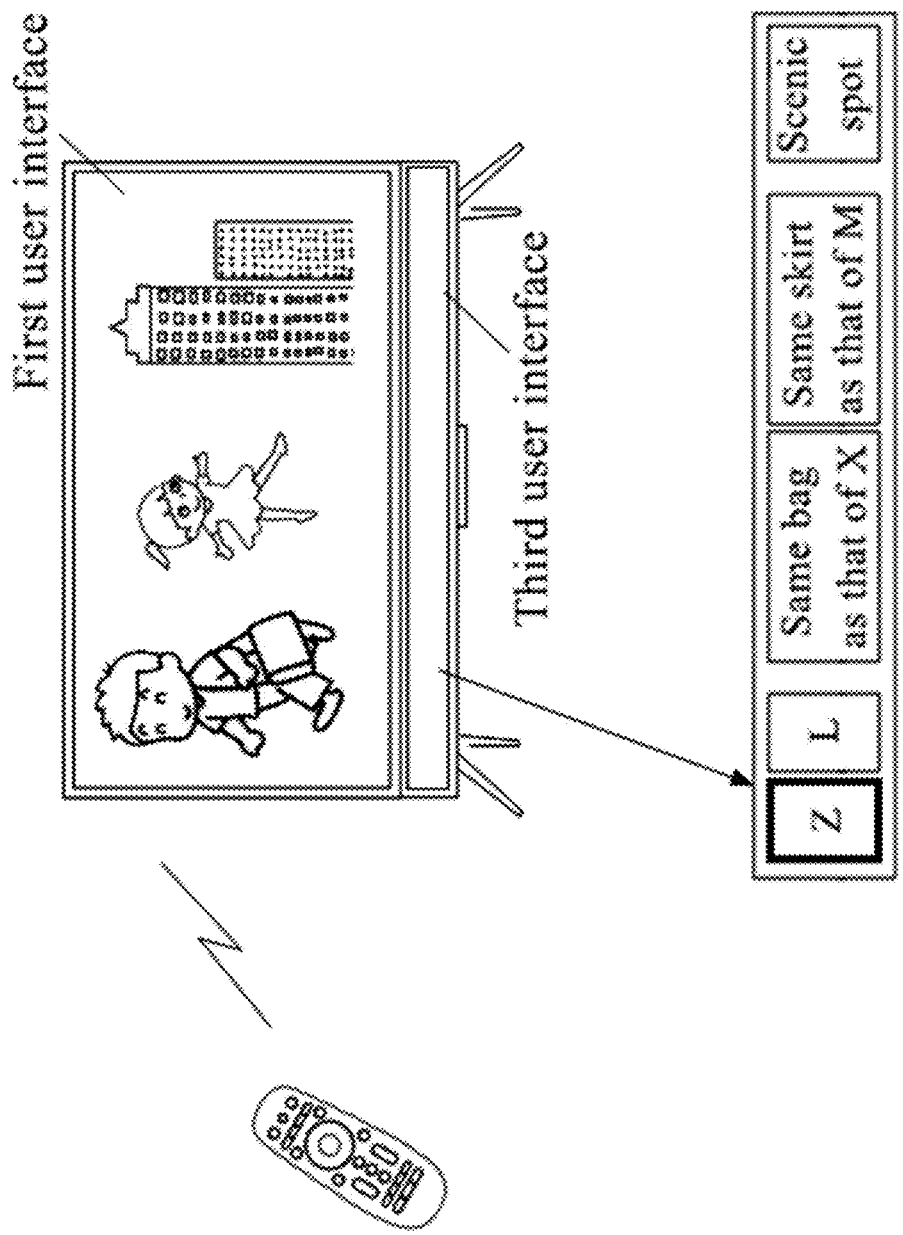
FIG. 14 is a fourth schematic diagram showing the interaction process of the display apparatus according to some embodiments.

Exemplarily, FIG. 14 is a fourth schematic diagram of the interaction process of the display apparatus according to an exemplary embodiment of the disclosure. As shown in FIG. 14, the user can press the screen switch button on the remote control or input "select small screen" by voice, to remove the selector from the first display screen and switch from the first display screen to the second display screen; when the selector is shown on the second display screen, the user can switch the selected search identifier back and forth through the up/down/left/right directional buttons on the remote control, and identify the search identifier by drawing a bold line or darkening color on the edge, for example: input "Z" by voice, then the search identifier "Z" is darkened. Of course, the remote control can also be used to switch the selected search identifier back and forth.

It should be understood that the second controller may also directly receive the control command for the selector and control the second display screen to display the selector in response to the control command.

In some exemplary embodiments, the first controller is further configured to:
  receive a first user input for indicating going back through the user input interface, and send the first user input to the second controller.

The second controller is configured to:
  control the second display screen to display the second user interface in response to the first user input.

Here, the first user input can be realized by voice or a remote control or a control panel of the second display screen. When the selector is moved to the second user interface, the first controller is further configured to receive the first user input for indicating going back through the user input interface and control the second display screen to display the second user interface in response to the first user input, that is, the second display screen stops displaying the third user interface.

Figure 15:
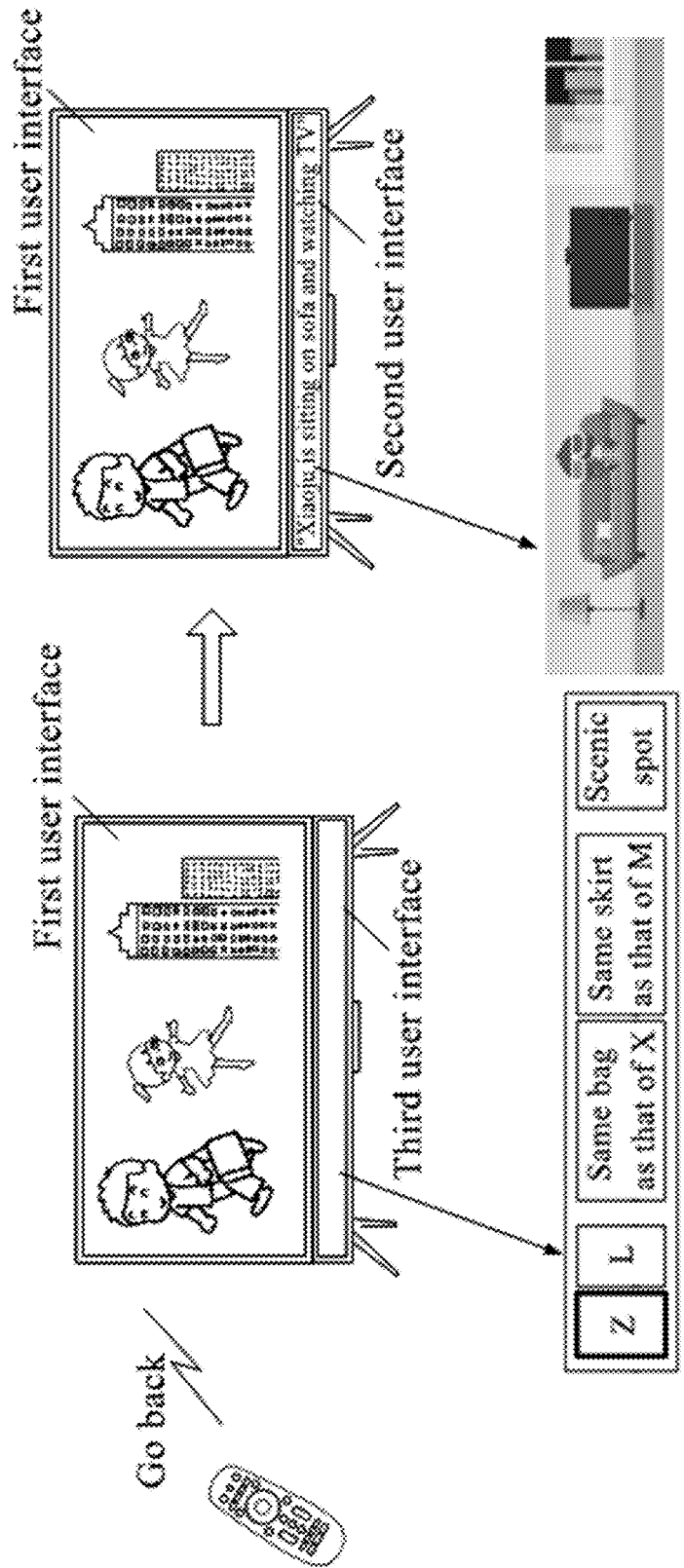
FIG. 15 is a fifth schematic diagram showing the interaction process of the display apparatus according to some embodiments.

Exemplarily, FIG. 15 is a fifth schematic diagram of the interaction process of the display apparatus according to an exemplary embodiment of the disclosure. As shown in FIG. 15, when the first controller inputs for example "going back to the previous interface" by voice or receives a first user input via the back key on the remote control, the second display screen stops displaying the third user interface and goes back to display the second user interface.

It should be understood that the second controller may also receive the first user input for indicating going back through the user input interface and control the second display screen to stop displaying the third user interface and display the second user interface in response to the first user input.

In some exemplary embodiments, the first controller is further configured to:
  receive a second user input for selecting any search identifier via the user input interface; in response to the second user input, pause playing the video, obtain the search information corresponding to the search identifier, and control the first display screen to display the search information, wherein the second user input is applied to the second display screen via the selector, and the second user interface includes the search information.

Exemplarily, the user may make the selector select "Z" by switching the selected search identifier, and then press the OK button on the remote control or input "Select Z" by voice to indicate selecting the search identifier.

Here, the second user input can be realized by voice or the remote control or the control panel of the second display screen. The second user input is applied to the second display screen via the selector, that is, when the first controller receives the second user input for indicating selecting a search identifier through the user input interface, the first controller sends the second user input to the second controller; the second controller controls the second display screen to identify the search identifier selected by the selector, and at the same time, the first display screen pauses playing the video and obtains the search information corresponding to the search identifier. Here, the way for the second controller to obtain the search information may be: the second controller sends the search identifier to the server and receives the corresponding search information returned from the server.

Here, the search information corresponding to the search identifier is the detailed information corresponding to the search identifier. For example: the search identifier may be "Z", and then the detailed information corresponding to the search identifier is the specific introduction for Z; the search identifier is "same bag as that of X", and then the detailed information corresponding to the search identifier is the purchase interface of the same bag as that of X.

In some exemplary embodiments, the search information is displayed floating on one side of the first user interface.

Figure 16:
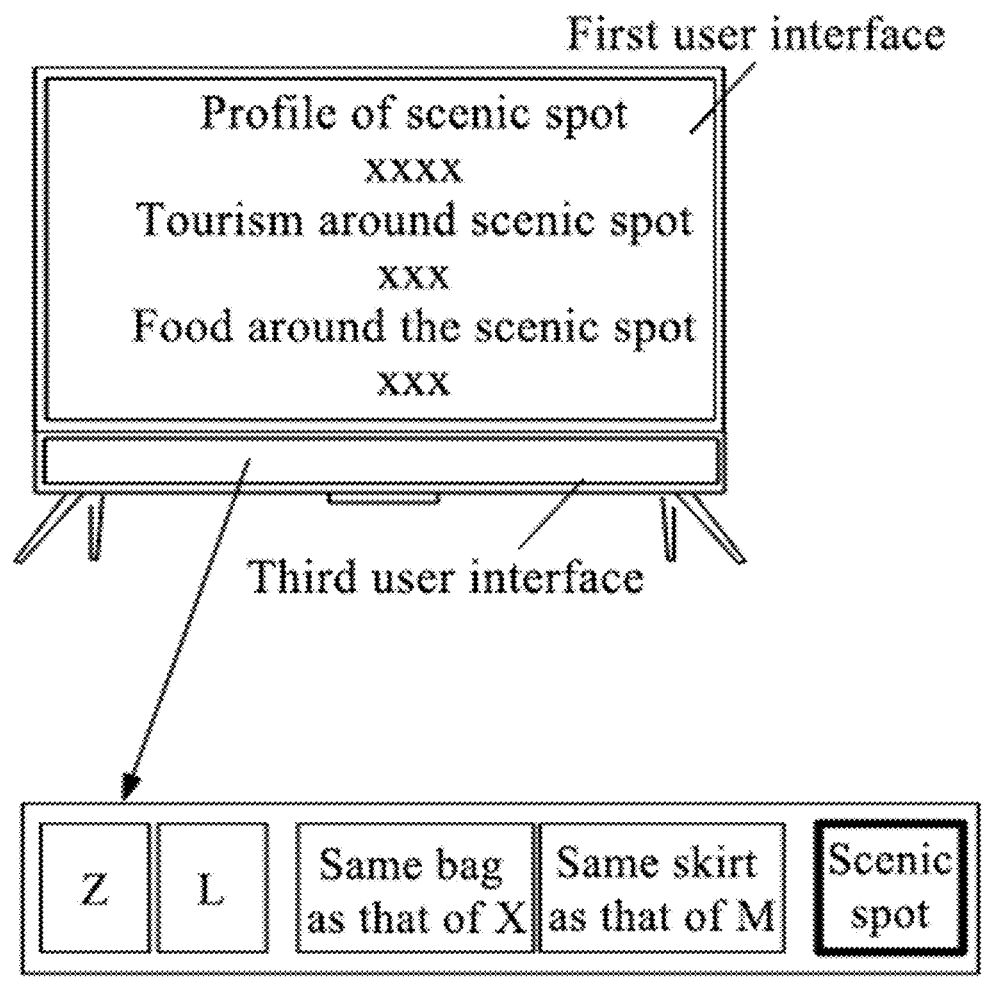
FIG. 16 is a sixth schematic diagram showing the interaction process of the display apparatus according to some embodiments.

Exemplarily, FIG. 16 is a sixth schematic diagram of the interaction process of the display apparatus according to an exemplary embodiment of the disclosure. As shown in FIG. 16, a search identifier (for example: the purchase link of the same clothing as that of M) is selected on the third user interface through a selector, wherein a thick line is drawn on the edge of the search identifier "scenic spot", the video in the first user interface is paused, and the search information of the scenic spot (including the profile of the scenic spot, tourism around the scenic spot, and food around the scenic spot) is displayed floating on left side of the first user interface. Here, the identifier "scenic spot" can be slid to skip to the first user interface by crossing the boundary of the interface, which is not limited in this embodiment.

Of course, the first controller may also control the first display screen to stop displaying the first user interface, so that the search information is displayed on the first display screen in full screen. This embodiment does not limit the display mode of the search information.

In this way, the search information corresponding to the search identifiers that the user is interested in can be displayed on the first display screen, improving the user experience.

In some exemplary embodiments, the first controller is further configured to:
receive a third user input for the search information through the user input interface, obtain associated information corresponding to the search information in response to the third user input, and control the first display screen to display the association information and remove the search information, where the associated information is text information or video information.

Here, the third user input can be realized by voice or a remote control or a control panel of the second display screen. The associated information corresponding to the search information may be the detailed information of the elements in the search information, for example: the search information is the purchase interface of the same bag as that of X. The third user input is directed on an element in the purchase interface, for example, it is directed on the element "add to shopping cart" in the purchase interface, then the associated information corresponding to the search information is a shopping cart interface; for another example, it is directed on the element "buy now" in the purchase interface, then the associated information corresponding to the search information is a payment interface.

For another example: the search identifier is Z, and the search information corresponding to the search identifier is detailed introduction for Z, including: gossip news, movies, family members, etc., where the associated information is the detailed information of any above information.

In some exemplary embodiments, when the associated information is text information, the first controller is specifically configured to control the associated information to be displayed floating on one side of the first user interface.

In some exemplary embodiments, when the associated information is video information, the first controller is configured to control the first display screen to display a fourth user interface which includes the associated information.

Figure 17:
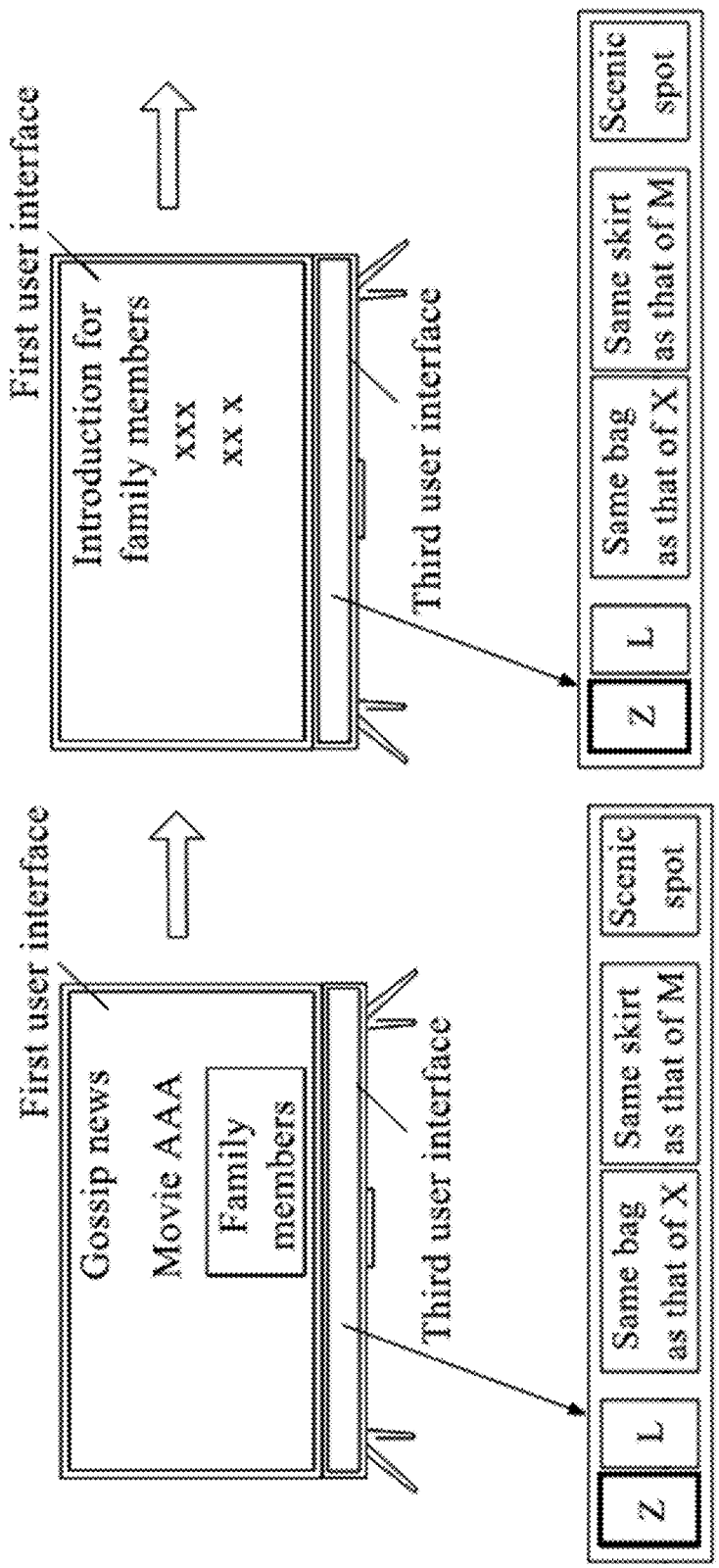
FIG. 17 is a seventh schematic diagram showing the interaction process of the display apparatus according to some embodiments.

Exemplarily, FIG. 17 is a seventh schematic diagram of the interaction process of the display apparatus according to an exemplary embodiment of the disclosure. As shown in FIG. 17, the search information is the introduction for Z, including: gossip news, Movie AAA, family members, etc. When the third user input is directed on the family members of Z, the first controller controls the first display screen to display the detailed introduction for the family members of Z floating on one side of the first user interface.

When the third user input is applied to Movie AAA, the first controller controls the first display screen to display a fourth user interface which includes the picture of the movie, that is, the first display screen stops displaying the first user interface.

In some exemplary embodiments, the first controller is further configured to:
receive a fourth user input for indicating going back via the user input interface, and control the first display screen to display the first user interface in response to the fourth user input.

Here, the fourth user input can be realized by voice or a remote control or a control panel of the second display screen. When the first display screen displays the fourth user interface, the first display screen may also be controlled to display the first user interface, i.e., stop displaying the fourth user interface, according to the fourth user input.

In some exemplary embodiments, the first controller is further configured to:
obtain the information of a next frame image of the video image within a preset time period, and send the information of the next frame image to a server through the first communicator, wherein the server is configured to obtain a search identifier of the next frame image according to the information of the next frame image and send search identifiers of objects in the next frame image to the second controller.

The second controller is configured to:
receive the search identifiers of the objects in the next frame image through the second communicator, and control the second display screen to display a fifth user interface, wherein the fifth user interface includes the search identifiers of the objects in the video image and the next frame image.

Here, the information of the next frame image of the video image includes at least the video information and the play time of this image, the video information includes at least the video name and the episode number corresponding to this image, and the play time is the displaying time of this frame in the video of this episode. For example: the video name is TV series AAA, the episode number corresponding to the video image is Episode 3, and the play time is 20 minutes and 50 seconds (the duration of the video of this episode may be 40 minutes), so the next frame image is the image displayed at 20 minutes and 51 seconds in Episode 3 of TV series AAA.

After obtaining the information of the next frame of video image in the first user interface, the first controller sends the information of the next frame image of video image to the server through the first communicator. The server is configured to obtain search identifiers of objects in the next frame image of video image according to the information of the next frame image of video image and send the search identifiers to the second controller.

Here, the way for the server to obtain the search identifiers of the objects in the next frame of video image is similar to the way to obtain the search identifiers of the objects in the video image, and the objects in the next frame of video image are similar to the objects in the video image, which will not be repeated here.

Next, the second controller controls the second display screen to display a fifth user interface, wherein the fifth user interface includes the search identifiers of the objects in the video image and the search identifiers of the objects in the next frame image of video image.

In some exemplary embodiments, the second controller is further configured to:

control the second display screen to display the search identifiers in a scrollable manner if the number of the search identifiers is greater than a preset value.

Referring to FIG. 13, when the second controller controls the second display screen to display the search identifiers of the objects in the video image, when the search identifiers of the objects in the next frame image of the video image are received within the preset duration, and when the number of search identifiers is greater than the preset value, the third user interface may also be provided with a scroll control. When the second controller receives an operation command for the scroll control, the second controller is further configured to control the second display screen to scroll in the fifth user interface which includes the search identifiers of the objects in the video image and the next frame image. In this way, the search identifier that is ignored due to the user's negligence is avoided.

Here, the operation command for the scroll control can be implemented by voice or a remote control or a control panel of the second display screen.

Figure 18:
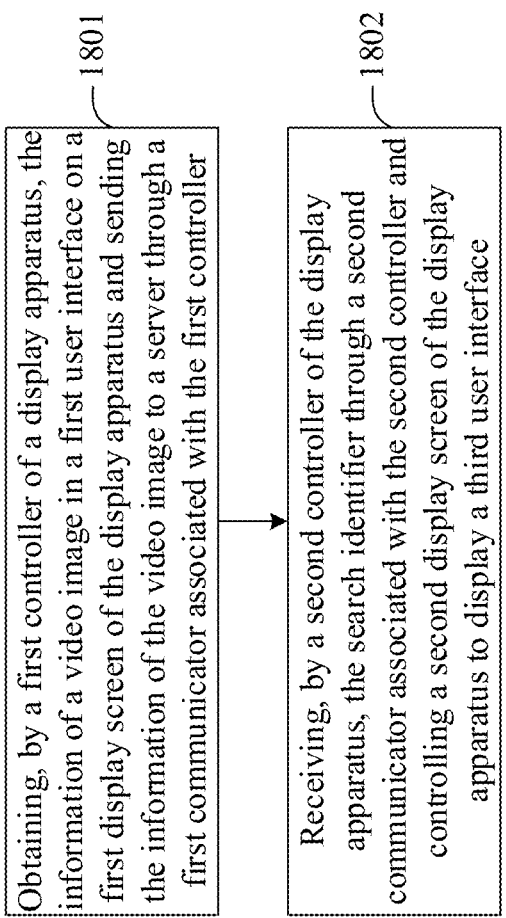
FIG. 18 is a first schematic flowchart of a display method according to some embodiments.

FIG. 18 is a first schematic flowchart of a display method according to an exemplary embodiment of the disclosure. The method is applied to a display apparatus having a first controller, a second controller, a first display screen, a second display screen, a first communicator and a second communicator. The first controller is configured to receive information through a first communicator, and the second controller is configured to receive information through a second communicator. The first controller is in communication with the first display screen, and the second controller in communication with the second display screen. While the first controller is in communication with the second controller. The first display screen and the second display screen are independent of each other, and two hardware control systems (the first controller and the second controller) are used between the first display screen and the second display screen. As shown in FIG. 18, the method includes the following.

S1801: obtaining, by a first controller of a display apparatus, the information of a video image in a first user interface on a first display screen of the display apparatus and sending the information of the video image to a server through a first communicator associated with the first controller, wherein the server is configured to obtain a search identifier of an object in the video image according to the information of the video image and send the search identifier to a second controller of the display apparatus.

S1802: receiving, by a second controller of the display apparatus, the search identifier through a second communicator associated with the second controller and controlling a second display screen of the display apparatus to display a third user interface, wherein the third user interface includes the search identifier of the object in the video image.

In some exemplary embodiments, the method further includes:

receiving, by the first controller, a control command for a selector on the first display screen via a user input interface, controlling the first display screen to remove the selector in response to the control command, and sending the control command to the second controller, wherein the selector is used for indicating that an item is selected;

controlling, by the second controller, the second display screen to display the selector, wherein the third user interface further includes the selector.

In some exemplary embodiments, the method further includes:

receiving, by the first controller, a first user input for indicating going back via the user input interface, and sending the first user input to the second controller;

controlling, by the second controller, the second display screen to display the second user interface in response to the first user input.

In some exemplary embodiments, the method further includes:

receiving, by the first controller, a second user input for indicating selecting any search identifier via the user input interface; and in response to the second user input, pausing, by the first controller, playing videos, obtaining the search information corresponding to the search identifier, and controlling the first display screen to display the search information, wherein the second user input is applied to the second display screen through the selector, and the second user interface includes the search information.

In some exemplary embodiments, the search information is displayed floating on one side of the first user interface.

In some exemplary embodiments, the method further includes:

receiving, by the first controller, a third user input for the search information via the user input interface, obtaining associated information corresponding to the search information in response to the third user input, and controlling the first display screen to display the association information and remove the search information, wherein the associated information is text information or video information.

In some exemplary embodiments, the method further includes:
if the associated information is text information, controlling, by the first controller, the associated information to be displayed floating on one side of the first user interface.

In some exemplary embodiments, the method further includes:
if the associated information is video information, controlling, by the first controller, the first display screen to display a fourth user interface which includes the associated information.

In some exemplary embodiments, the method further includes:
receiving, by the first controller, a fourth user input for indicating going back through the user input interface, and controlling the first display screen to display the first user interface in response to the fourth user input.

In some exemplary embodiments, the method further includes:
obtaining, by the first controller, the information of a next frame image of the video image within a preset time period, and sending the information of the next frame image to a server through the first communicator, wherein the server is configured to obtain a search identifier of the next frame image according to the information of the next frame and send search identifiers of objects in the next frame image to the second controller;
receiving, by the second controller, the search identifiers of the objects in the next frame image through the second communicator, and controlling the second display screen to display a fifth user interface, wherein the fifth user interface includes the search identifiers of the objects in the video image and the next frame image.

In some exemplary embodiments, the method further includes:
controlling, by the second controller, the second display screen to scroll the search identifiers if the number of the search identifiers is greater than a preset value.

Figure 19:
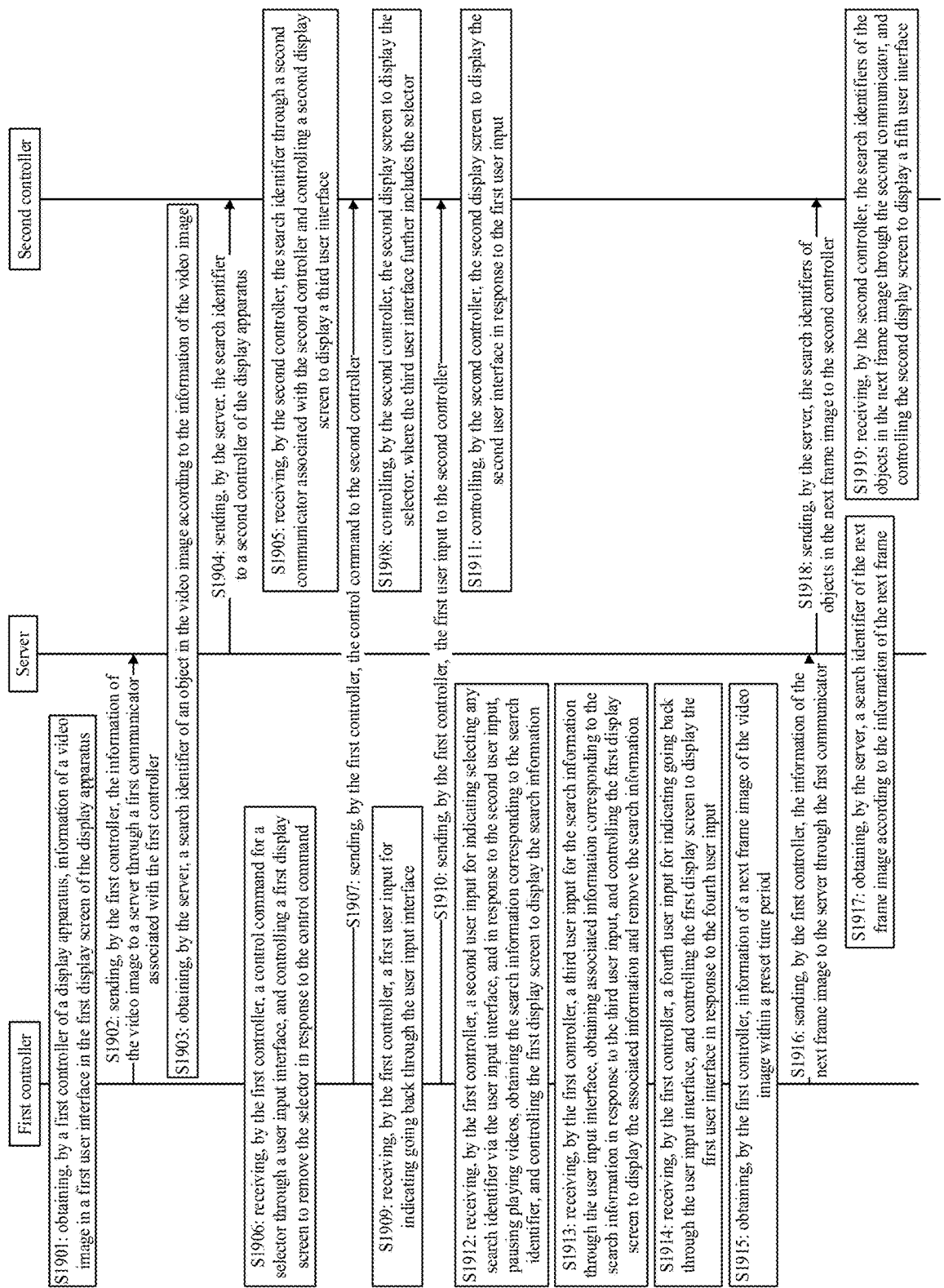
FIG. 19 is a second schematic flowchart of a display method according to some embodiments.

FIG. 19 is a second schematic flowchart of a display method according to an exemplary embodiment of the disclosure. This method is applied to a display apparatus and a server. The display apparatus has a first controller, a second controller, a first display screen, a second display screen, a first communicator and a second communicator. The first controller is configured to receive information through a first communicator, and the second controller is configured to receive information through a second communicator. The first controller is in communication with the first display screen, and the second controller in communication with the second display screen. While the first controller is in communication with the second controller. The first display screen and the second display screen are independent of each other, and two hardware control systems (the first controller and the second controller) are used between the first display screen and the second display screen. As shown in FIG. 19, the method includes the following operations.

S1901: obtaining, by a first controller of a display apparatus, information of a video image in a first user interface in the first display screen of the display apparatus.

S1902: sending, by the first controller, the information of the video image to a server through a first communicator associated with the first controller.

S1903: obtaining, by the server, a search identifier of an object in the video image according to the information of the video image.

S1904: sending, by the server, the search identifier to a second controller of the display apparatus.

S1905: receiving, by the second controller, the search identifier through a second communicator associated with the second controller and controlling a second display screen to display a third user interface, wherein the third user interface includes the search identifier of the object in the video image.

S1906: receiving, by the first controller, a control command for a selector through a user input interface, and controlling a first display screen to remove the selector in response to the control command, wherein the selector is for indicating an item is selected.

S1907: sending, by the first controller, the control command to the second controller.

S1908: controlling, by the second controller, the second display screen to display the selector, where the third user interface further includes the selector.

S1909: receiving, by the first controller, a first user input for indicating going back through the user input interface.

S1910: sending, by the first controller, the first user input to the second controller.

S1911: controlling, by the second controller, the second display screen to display the second user interface in response to the first user input.

S1912: receiving, by the first controller, a second user input for indicating selecting any search identifier via the user input interface, and in response to the second user input, pausing playing videos, obtaining the search information corresponding to the search identifier, and controlling the first display screen to display the search information.

S1913: receiving, by the first controller, a third user input for the search information through the user input interface, obtaining associated information corresponding to the search information in response to the third user input, and controlling the first display screen to display the associated information and remove the search information.

S1914: receiving, by the first controller, a fourth user input for indicating going back through the user input interface, and controlling the first display screen to display the first user interface in response to the fourth user input.

S1915: obtaining, by the first controller, information of a next frame image of the video image within a preset time period.

S1916: sending, by the first controller, the information of the next frame image to the server through the first communicator.

S1917: obtaining, by the server, a search identifier of the next frame image according to the information of the next frame.

S1918: sending, by the server, the search identifiers of objects in the next frame image to the second controller.

S1919: receiving, by the second controller, the search identifiers of the objects in the next frame image through the second communicator, and controlling the second display screen to display a fifth user interface, wherein the fifth user interface includes the search identifiers of the objects in the video image and the next frame image.

Finally, it should be noted that the above embodiments are only used to illustrate but not limit the embodiments of the disclosure; although the disclosure has been illustrated in details with reference to the above embodiments, it should be understood by those ordinary skilled in the art that they can still modify the above embodiments or replace some or all of the elements therein; and these modifications and replacements do not make the essence of the corresponding embodiments depart from the scope of the disclosure.

What is claimed is:

1. A display apparatus, comprising:
a first display screen configured for displaying an image or a user interface;
a second display screen configured for displaying an image or a user interface;
a communicator comprising a first communicator and a second communicator and configured to communicate with a server;
a user input interface configured to receive commands input from a user;
a first controller in communication with the first display screen; and
a second controller in communication with the second display screen and the first controller; wherein
the first controller is configured to:
obtain information of a video image in a first user interface on the first display screen and send the information of the video image to the server through the first communicator associated with the first controller, wherein the server is configured to obtain a search identifier of an object in the video image according to the information of the video image and send the search identifier to the second controller;
the second controller is configured to;
receive the search identifier through the second communicator associated with the second controller and control the second display screen to switch from a second user interface to a third user interface, wherein the third user interface includes the search identifier of the object in the video image;
wherein the first controller is further configured to:
receive a control command for a selector on the first display screen via the user input interface, in response to the control command, control the first display screen to remove the selector, and send the control command to the second controller;
the second controller is further configured to:
control the second display screen to display the selector, wherein the third user interface further includes the selector.

2. The display apparatus according to claim 1, wherein the first controller is further configured to:
receive a first user input for indicating going back to a previous interface via the user input interface, and send the first user input to the second controller;
the second controller is further configured to:
control the second display screen to switch to the second user interface from the third user interface in response to the first user input.

3. The display apparatus according to claim 1, wherein the first controller is further configured to:
receive a second user input for selecting a first search identifier on the second display screen via the user input interface;
in response to the second user input, pause playing a video to which the video image belongs, obtain search information corresponding to the first search identifier, and control the first display screen to display search information, wherein the second user input is applied to the second display screen via the selector, and a size of the first display screen is larger than a size of the second display screen.

4. The display apparatus according to claim 3, wherein the search information is displayed floating on a side of the first user interface.

5. The display apparatus according to claim 4, wherein the first controller is further configured to:
receive a third user input for the search information through the user input interface;
obtain associated information corresponding to the search information in response to the third user input; and
control the first display screen to display the associated information and remove the search information, where the associated information is text information or video information.

6. The display apparatus according to claim 5, wherein the first controller is further configured to:
control the associated information to be displayed floating on a side of the first user interface, if the associated information is the text information.

7. The display apparatus according to claim 5, wherein the first controller is further configured to:
control the first display screen to display a fourth user interface comprising the associated information, if the associated information is the video information.

8. The display apparatus according to claim 3, wherein the first controller is further configured to:
receive a fourth user input for indicating going back to a previous interface via the user input interface; and
control the first display screen to display the first user interface in response to the fourth user input.

9. The display apparatus according to claim 1, wherein the first controller is further configured to:
obtain information of a next frame image of the video image within a preset time period, and send the information of the next frame image to the server through the first communicator, wherein the server is configured to obtain a search identifier of an object in the next frame image according to the information of the next frame image and send the search identifier of the object in in the next frame image to the second controller;
the second controller is further configured to:
receive the search identifier of the object in the next frame image through the second communicator, and control the second display screen to display a fifth user interface, wherein the fifth user interface comprises a search identifier of the object in the video image and a search identifier of the object in the next frame image.

10. The display apparatus according to claim 1, wherein the second controller is further configured to:
control the second display screen to display search identifiers in a scrollable manner if a quantity of the search identifiers is greater than a preset value.

11. A display method for a display apparatus, comprising:
obtaining, by a first controller of the display apparatus, information of a video image in a first user interface on a first display screen of the display apparatus and sending the information of the video image to a server through a first communicator associated with the first controller, wherein the server is configured to obtain a search identifier of an object in the video image according to the information of the video image and send the search identifier to a second controller of the display apparatus;
receiving, by a second controller of the display apparatus, the search identifier through a second communicator associated with the second controller and controlling a second display screen of the display apparatus to switch from a second user interface to a third user interface, wherein the third user interface comprises the search identifier of the object in the video image;

receiving, by the first controller, a control command for a selector on the first display screen via a user input interface, in response to the control command, controlling the first display screen to remove the selector, and sending the control command to the second controller;

controlling, by the second controller, the second display screen to display the selector, wherein the third user interface further comprises the selector.

12. The display method according to claim 10, further comprising:

receiving, by the first controller, a first user input for indicating going back to a previous interface via the user input interface, and sending the first user input to the second controller;

controlling, by the second controller, the second display screen to switch to the second user interface from the third user interface in response to the first user input.

13. The display method according to claim 10, further comprising:

receiving, by the first controller, a second user input for selecting a first search identifier on the second display screen via the user input interface; and in response to the second user input, pausing playing a video to which the video image belongs, by the first controller, obtaining search information corresponding to the first search identifier, and controlling the first display screen to display the search information, wherein the second user input is applied to the second display screen via the selector, and a size of the first display screen is larger than a size of the second display screen.

14. The display method according to claim 13, further comprising:

controlling, by the first controller, the search information to be displayed floating on a side of the first user interface.

15. The display method according to claim 14, further comprising:

receiving, by the first controller, a third user input for the search information via the user input interface, obtaining associated information corresponding to the search information in response to the third user input, and controlling the first display screen to display the associated information and remove the search information, wherein the associated information is text information or video information.

16. The display method according to claim 15, further comprising:

if the associated information is the text information, controlling, by the first controller, the associated information to be displayed floating on a side of the first user interface.

17. The display method according to claim 15, further comprising:

if the associated information is the video information, controlling, by the first controller, the first display screen to display a fourth user interface comprising the associated information.

18. The display method according to claim 13, further comprising:

receiving, by the first controller, a fourth user input for indicating going back to a previous interface via the user input interface, and controlling the first display screen to display the first user interface in response to the fourth user input.

* * * * *